US011574208B2

(12) United States Patent
Javeri et al.

(10) Patent No.: US 11,574,208 B2
(45) Date of Patent: Feb. 7, 2023

(54) PREDICTING REFUELING INFORMATION FOR A CLIENT DEVICE

(71) Applicant: Verizon Connect Inc., Atlanta, GA (US)

(72) Inventors: Vipul Shyam Javeri, Atlanta, GA (US); Aaroon Thowfiq Shahul Hameed, Alpharetta, GA (US); Diego Mondragon, Roswell, GA (US); Mourya C. Darivemula, Sugar Hill, GA (US)

(73) Assignee: Verizon Connect Inc., Atlanta, GA (US)

( * ) Notice: Subject to any disclaimer, the term of this patent is extended or adjusted under 35 U.S.C. 154(b) by 1182 days.

(21) Appl. No.: 16/110,642

(22) Filed: Aug. 23, 2018

(65) Prior Publication Data

US 2020/0065679 A1    Feb. 27, 2020

(51) Int. Cl.
*G06N 5/04* (2006.01)
*G01C 21/34* (2006.01)

(52) U.S. Cl.
CPC .............. *G06N 5/04* (2013.01); *G01C 21/343* (2013.01); *G01C 21/3469* (2013.01)

(58) Field of Classification Search
CPC ...................................................... G06N 5/04
See application file for complete search history.

(56) References Cited

U.S. PATENT DOCUMENTS

| 8,565,948 | B2 * | 10/2013 | Pudar | B60W 40/09 |
| | | | | 903/902 |
| 8,606,497 | B2 * | 12/2013 | Doherty | H04L 67/535 |
| | | | | 701/400 |
| 9,151,631 | B2 * | 10/2015 | Lee | G01C 21/3626 |
| 10,012,998 | B2 * | 7/2018 | Nimchuk | G06Q 10/02 |
| 10,878,328 | B2 * | 12/2020 | Mathur | G01C 21/3484 |
| 11,348,106 | B2 * | 5/2022 | Gibso | G06Q 20/326 |
| 2015/0226563 | A1 * | 8/2015 | Cox | G07C 5/00 |
| | | | | 701/29.1 |
| 2016/0305791 | A1 * | 10/2016 | Neubecker | B60L 58/12 |
| 2020/0065679 | A1 * | 2/2020 | Javeri | G01C 21/3469 |

* cited by examiner

*Primary Examiner* — Michael A Berns

(57) ABSTRACT

A device can receive fuel information associated with a vehicle and location information associated with the vehicle. The device can determine a home location associated with a user of a client device and a destination location associated with the user. The device can determine an estimated fuel usage, of the vehicle, associated with a route between the home location and the destination location. The device can determine an estimated quantity of trips between the home location and the destination location. The device can generate refueling information, associated with the vehicle, wherein the refueling information includes information identifying at least one of: the estimated quantity of trips between the home location and the destination location, a recommended date and time to refuel the vehicle, or a recommended refueling location. The device can transmit the refueling information to the client device.

20 Claims, 15 Drawing Sheets

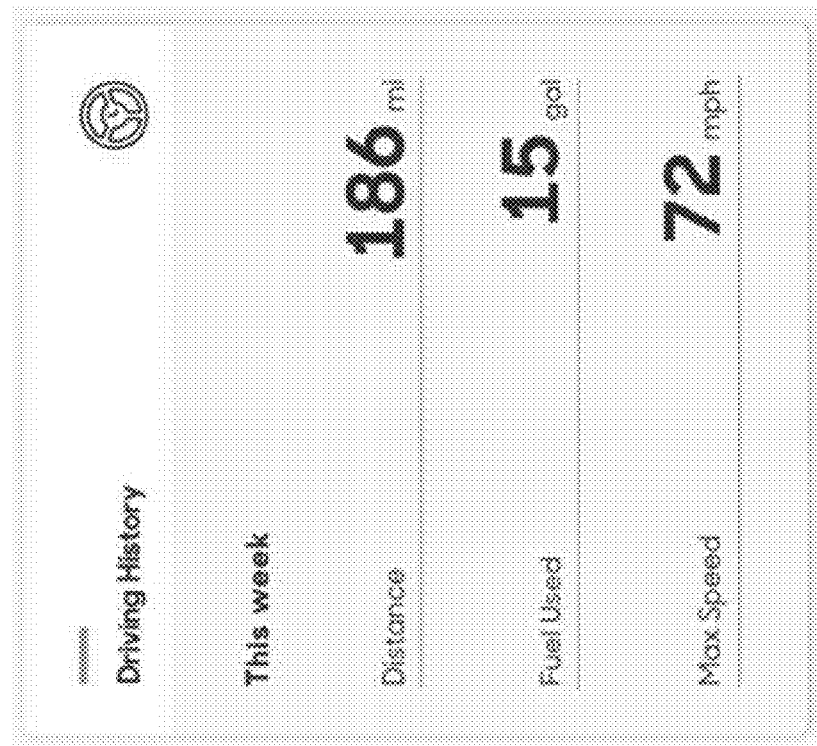
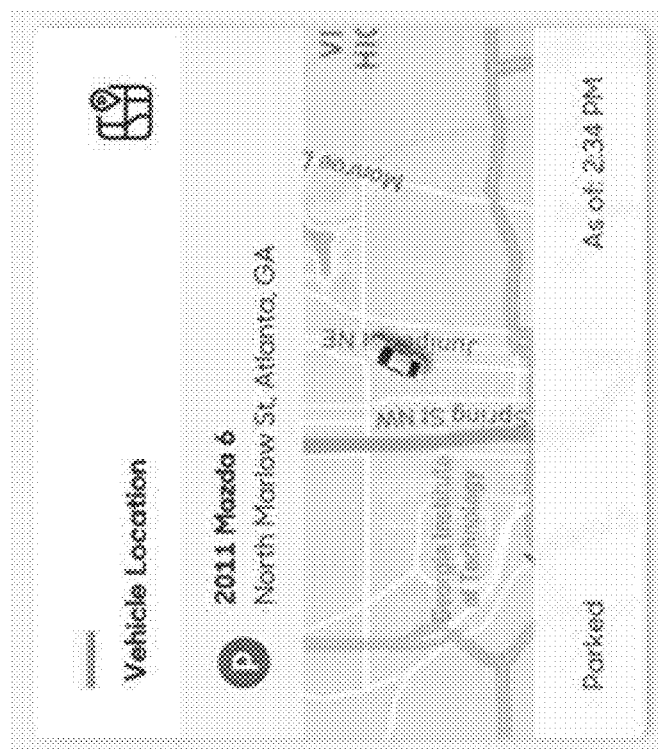
FIG. 2A

PREDICTING REFUELING INFORMATION FOR A CLIENT DEVICE

BACKGROUND

Vehicles can generate a variety of indicators that provide various types of fuel information associated with the vehicle. For example, the vehicle can include a fuel gauge indicator that indicates an amount of fuel in a fuel tank of the vehicle, a range indicator that indicates an estimated number of miles the vehicle can travel before having to refuel, and/or the like.

BRIEF DESCRIPTION OF THE DRAWINGS

FIGS. 2A-2C are diagrams of example views of a graphical user interface.

DETAILED DESCRIPTION OF PREFERRED EMBODIMENTS

Figure 1A:
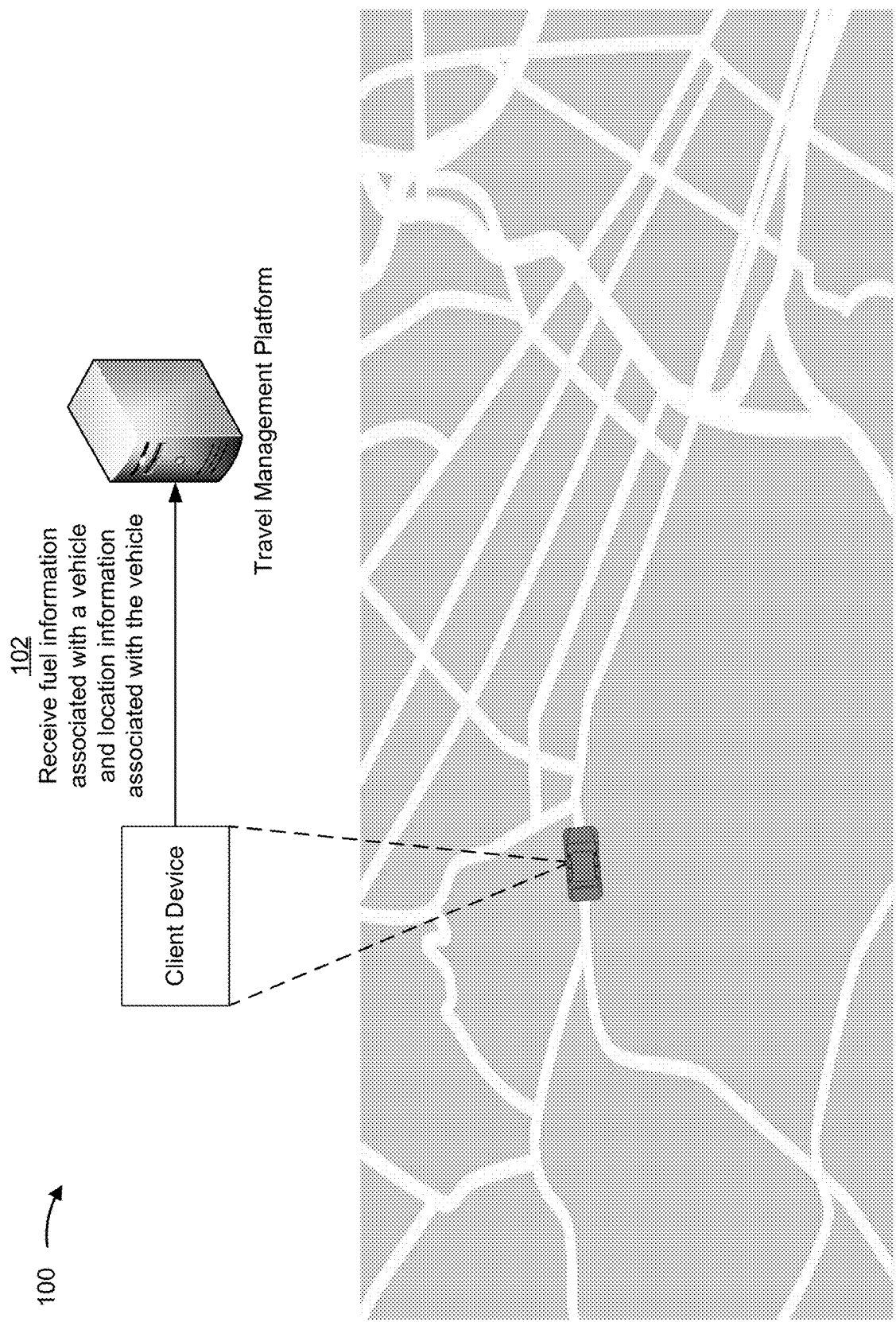
FIGS. 1A-1F are diagrams of an example implementation described herein.

The following detailed description of example implementations refers to the accompanying drawings. The same reference numbers in different drawings can identify the same or similar elements.

In some cases, a user can use on-vehicle indicators to determine when to refuel a vehicle. For example, the user can use a fuel gauge indicator to view an estimation of an amount fuel left in the tank, a range indicator to estimate a quantity of miles remaining, and/or the like. In some cases, a user can use a client device to find refueling location such as gas stations, recharging stations, and/or the like, to refuel the vehicle. In some cases, the client device can transmit data to and/or from a mapping platform to determine a refueling location relative to the vehicle's location. However, these on-vehicle indicators may not take into account additional considerations to aid the driver in determining when and where to refuel the vehicle. For example, the on-vehicle indicators may not automatically take into account trends associated with the user's driving behavior, such as miles driven per day, preferred places and times to refuel, and/or the like, to provide more complete refueling information that indicates when and where to refuel the vehicle.

Some implementations described herein provide a travel management platform that is capable of providing predictive refueling information based on analyzing fuel information associated with a vehicle, location information associated with a client device, driving behavior of a user of the client device, and/or the like. In some implementations, the travel management platform can receive fuel information associated with a vehicle and location information associated with the vehicle. In some implementations, the travel management platform can determine a home location associated with a user of a client device and a destination location associated with the user. In some implementations, the travel management platform, based on the fuel information and driving behavior information associated with the user, can determine an estimated fuel usage of the vehicle, associated with a route between the home location and the destination location. In some implementations, the travel management platform, based on the fuel information and the estimated fuel usage, can determine an estimated quantity of trips between the home location and the destination location. In some implementations, the travel management platform can generate refueling information, associated with the vehicle, based on the driving behavior information and the estimated quantity of trips between the home location and the destination location, wherein the refueling information includes information identifying at least one of: the estimated quantity of trips between the home location and the destination location, a recommended date and time to refuel the vehicle, or a recommended refueling location. In some implementations, the travel management platform can transmit the refueling information to the client device.

In this way, several different stages of the process for determining when and where to refuel the vehicle are automated, which can remove human subjectivity and waste from the process, and which can improve speed and efficiency of the process and conserve computing resources such as processor resources, memory resources, and/or the like, that would otherwise have been used to identify a refueling location, generate navigation instructions to the refueling location, and/or the like. Furthermore, implementations described herein use a rigorous, computerized process to perform tasks or roles that were not previously performed or were previously performed using subjective human intuition or input, such as determining an optimal time and place to refuel, determining a price-effective refueling location, and/or the like Finally, automating the process for determining when and where to refuel the vehicle conserves computing resources (e.g., processor resources, memory resources, and/or the like) that would otherwise be wasted in attempting to determine best time and locations for refueling.

FIGS. 1A-1F are diagrams of an overview of an example implementation 100 described herein. As shown in FIGS. 1A-1F, implementation 100 can include various devices, such as a client device, a travel management platform, and/or the like.

In some implementations, the client device can be a device associated with a user and a vehicle. In some implementations, the client device can be a device capable of communicating with the travel management platform to receive refueling information. The client device can include a display to display the refueling information, can include a speaker to provide the refueling information via audio, and/or the like. In some implementations, the client device can transmit various types of information to the travel management platform. For example, the client device can transmit location information associated with the client device, fuel information associated with the vehicle, driving behavior information associated with the user, and/or the like.

In some implementations, the location information associated with the client device can include information identifying the current location of the client device, information identifying one or more previous locations associated with the client (referred to as historical location information), and/or the like. The location information can include world geodetic system (WGS) coordinates associated with the client device's geographical location, coordinates associated with client device's geographical location expressed in another coordinate system, and/or the like. The location information can include location information associated with time or a trip, such as a start date and time of a trip, an end date and time of a trip, a start location, an end location, start zip code, end zip code, layover time between previous trips, and/or the like.

In some implementations, the fuel information associated with the vehicle can include various types of information about the fuel associated with vehicle. For example, the fuel information can identify a fuel type of the vehicle, such as whether the vehicle uses gasoline fuel, diesel fuel, electricity, a hybrid of a plurality of fuel types, and/or the like. The fuel information can also identify an amount fuel remaining in a fuel tank of the vehicle, a fuel economy of the vehicle based on an average fuel usage of the vehicle (e.g., miles per gallon, miles per charge, and/or the like), a fuel economy of the vehicle based on the make, model, year of the vehicle, a fuel capacity of the vehicle, and/or the like.

In some implementations, the driving behavior information associated with the user can identify various types of information associated with the user's driving behavior, such as acceleration information associated with the user (e.g., acceleration information of how often the user accelerates, and/or the like), braking information associated with the user (e.g., braking information of how the user brakes, how often the user brakes, and/or the like), average speed information associated with the user, an amount of driving time associated with the user, historical route information associated with the user, travel times associated with the user (e.g., a time that the user starts a trip, a time that the user ends the trip, and/or the like), historical refueling information associated with the user (e.g., refueling stations the user uses to refuel the vehicle, the user's preferred refueling stations, and/or the like), and/or the like. The collection, storage, and use of such information can be subject to consent of the user to such activity, for example, through well known "opt-in" or "opt-out" processes as can be appropriate for the situation and type of information.

In some implementations, the travel management platform can communicate with the client device to receive the fuel information, the driving behavior information, and the location information associated with the vehicle with which the client device is associated. The travel management platform can determine, based on the fuel information, the driving behavior information, and the location information, a home location associated with a user of the client device and a destination location associated with the user. A destination location can be a commonly traveled location associated with the user, such as a work location, school location, gym location, and/or the like. Further, the travel management platform can generate refueling information associated with the vehicle and can transmit the refueling information to the client device. For example, the travel management platform can generate a recommended location to refuel, a recommended time to refuel, and/or the like.

As shown by FIG. 1A, and by reference number 102, the travel management platform can receive, from the client device, the fuel information associated with the vehicle and the location information associated with the vehicle. The mapping platform can receive the fuel information and the location information automatically, based on a particular time interval (e.g., every 30 seconds, every 5 minutes, and/or the like), based on detecting movement of the client device, based on one or more parameters provided by the user, and/or the like. For example, the travel management platform can receive the fuel information and driving information based on identifying when the client device commonly begins movement, based on detecting a new route being traveled by the user, and/or the like.

In some implementations, the client device can receive the fuel information from the vehicle (e.g., via a vehicle management device integrated into the vehicle, via a device communicatively connected to the vehicle, such as an on-board diagnostics (OBD) device, and/or the like) and can provide the fuel information to the travel management platform. In some implementations, the vehicle management device and/or the OBD device can provide the fuel information directly to the travel management platform.

Figure 1B:
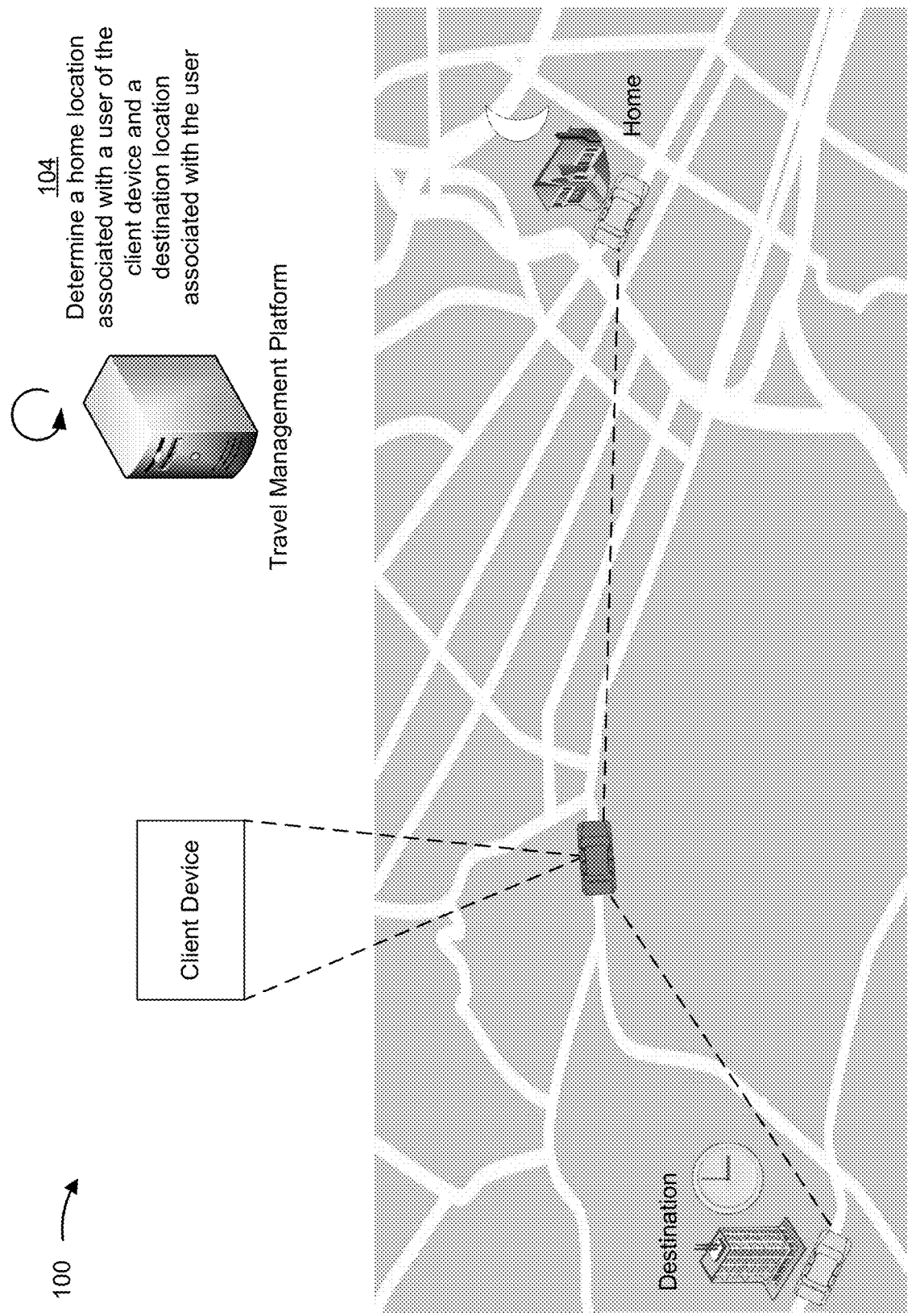

As shown by FIG. 1B, and by reference number 104, the travel management platform can determine, based on the location information, a home location associated with a user of a client device and a destination location associated with the user. The travel management platform can determine the home location and the destination location based on determining that a location of a vehicle remains substantially the same for a time period that satisfies a threshold time period (e.g., 5 hours, 8 hours, and/or the like), based on determining that the time period is associated with a particular time window (e.g., during the hours of 9 am and 4 pm of a day, during the hours of 8 pm of a first day and 7 am of a second day, and/or the like), based on determining that the vehicle is located at the location during the particular time window for a quantity of days that satisfies a threshold quantity of days (e.g., 15 days, 30 days, and/or the like), and/or the like. As an example, the travel management platform can determine the home location to be a location where the user parks the vehicle for an 8 hour time period overnight (e.g., during the hours of 8 pm and 7 am) for 30 days. As another example, the travel management platform can determine the destination to be a location where the user parks the vehicle for a 5 hour time period during the day (e.g., during the hours of 9 am and 4 pm) for 15 days.

In some implementations the travel management platform can use a continuous time period for determining the home location and/or the destination location. In some implementations, the travel management platform can aggregate a plurality of time periods to determine the home location and/or the destination location. For example, the travel management platform can aggregate a plurality of time periods where the user parks the vehicle at the same location during the hours of 9 am and 4 pm during the day to determine the destination location. In this way, if the user uses the vehicle to run an errand, to travel to a restaurant for lunch, and/or the like (which can interrupt a continuous time period that the vehicle is parked at the user's work location), the travel management platform can aggregate the time periods that the user parks the car at the work location to determine the destination location.

In some implementations, the travel management platform can use machine learning to determine the home location and/or destination location. For example, the travel management platform can use a machine learning algorithm, such as a Density Based Spatial Clustering of Application with Noise (DBSCAN) and/or the like to cluster location information, associated the user, into a plurality of clusters, and to determine the home location and/or destination location based on analyzing the plurality of clusters. The travel management platform can cluster location information associated with the vehicle being static for the first and last trip of the day for a user, and form clusters based on the locations being within a particular distance from each other. Based on the plurality of clusters, the travel management platform can select a cluster, of the plurality of clusters, with the greatest quantity of location points to proceed with determining the home location. Further, the travel management platform can calculate the center point of the saved cluster using another machine learning algorithm (e.g., k Nearest Neighbor (k-NN), etc.). Additionally, the travel management platform can reverse geocode the calculated center point to a readable address and tag the readable address as the home location.

Based on calculating the home location, the travel management platform can use the machine learning algorithm to determine the destination location. For example, the travel management platform can use the machine learning algorithm (e.g., DBSCAN and/or the like) to generate clusters of locations associated with a parked location of the vehicle over a quantity of days, based on the vehicle being parked for a time duration that satisfies a threshold time duration, and/or the like. The travel management platform can filter the clusters by removing locations associated with the home location. Further, the travel management platform can select a cluster, of the plurality of clusters, that includes a greatest quantity of location data points, and calculate a center point of the cluster using a machine learning algorithm (e.g., k-NN, etc.). Based on calculating the center point, the travel management platform can reverse geocode the enter point to a readable address, and tag the readable address as the destination location.

In some implementations, the user may provide, to the travel management platform, information identifying the home location and/or the destination location. For example, the user may provide the information identifying the home location and/or the destination location as input to the client device, and the client device may provide the information identifying the home location and/or the destination location to travel management platform.

Figure 1C:
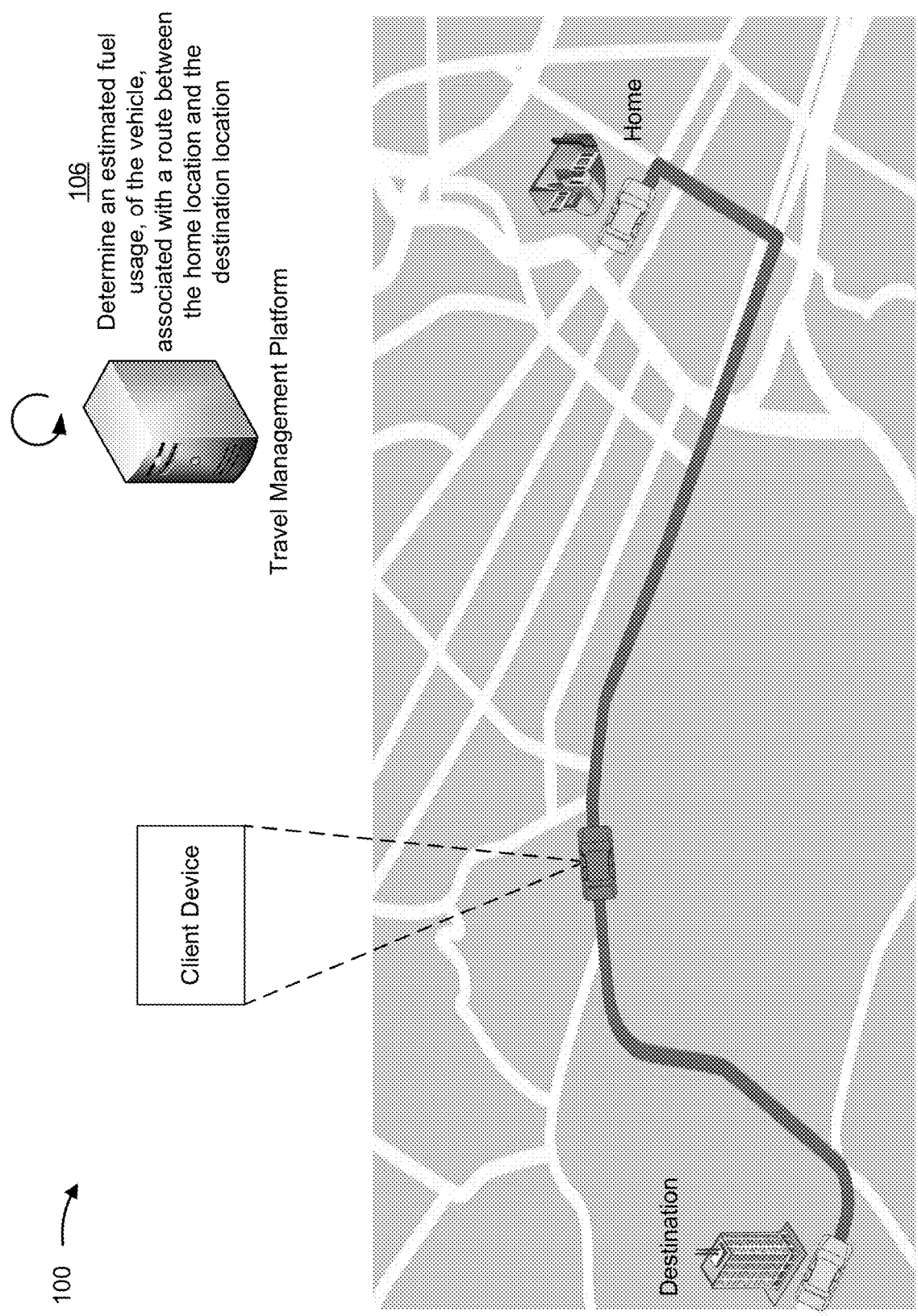

As shown by FIG. 1C, and by reference number 106, the travel management platform can determine, based on the fuel information and driving behavior information associated with the user, an estimated fuel usage, of the vehicle, associated with a route between the home location and the destination location. The travel management platform can determine the estimated fuel usage by determining the fuel information at the start of a trip and at the end of the trip to determine an amount of fuel that is used during the trip, and can estimate the quantity of trips based on determining the amount of fuel used during the trip. In some implementations, the travel management platform can determine the route based on the driving behavior information that identifies one or more routes previously traveled by the user between the home location and the destination location, based on the route information provided by a navigation platform, and/or the like. The travel management platform can estimate the estimated fuel usage for the vehicle based on determining the route and based on fuel economy information provided by the vehicle, based on the refueling behavior identified in the driving behavior information of the user (e.g., that identifies a quantity of miles the user travels before having to refuel, etc.), based on fuel economy information associated with the make of the vehicle, model of the vehicle, year of manufacture of the vehicle, and/or the like.

In some implementations, the travel management platform can determine different refueling information and a different estimated fuel usage for when the user is driving from the home location to the destination location and for when the user is driving from the destination location to the home location. For example, the travel management platform can determine different refueling information and a different estimated fuel usage based on determining a different route for travel from the home location to the destination location and for travel from the destination location to the home location. In another example, the travel management platform can determine a different estimated fuel usage for the route between the home location and the destination location than from the route between the home location and the destination location based on changes in driving behavior information such as traffic changes (based on time of day, higher volume traffic in one direction versus the other direction, and/or the like), and/or the like.

In some implementations, the travel management platform can use driving behavior information associated with one or more other users that are associated with similar home and destination location information. The travel management platform can use the driving behavior information associated with one or more other users in the absence of the user's driver behavior information, to augment the user's driving behavior information, and/or the like. The travel management platform can use a machine learning algorithm to cluster the driving behavior information associated with the one or more other users. For example, the travel management platform can use a machine learning algorithm (e.g., Bisecting K Means and/or the like) to form clusters of the one or more other users. The travel management platform can use a preparatory analysis to segment the one or more other users based on the associated driving behavior information. The travel management platform can collect different attributes associated with the driving behavior information of the one or more other users and convert the attributes to a different format to implement a machine learning model, such as converting the attributes to a dense matrix or vector using Singular Value Decomposition (SVD).

Figure 1D:
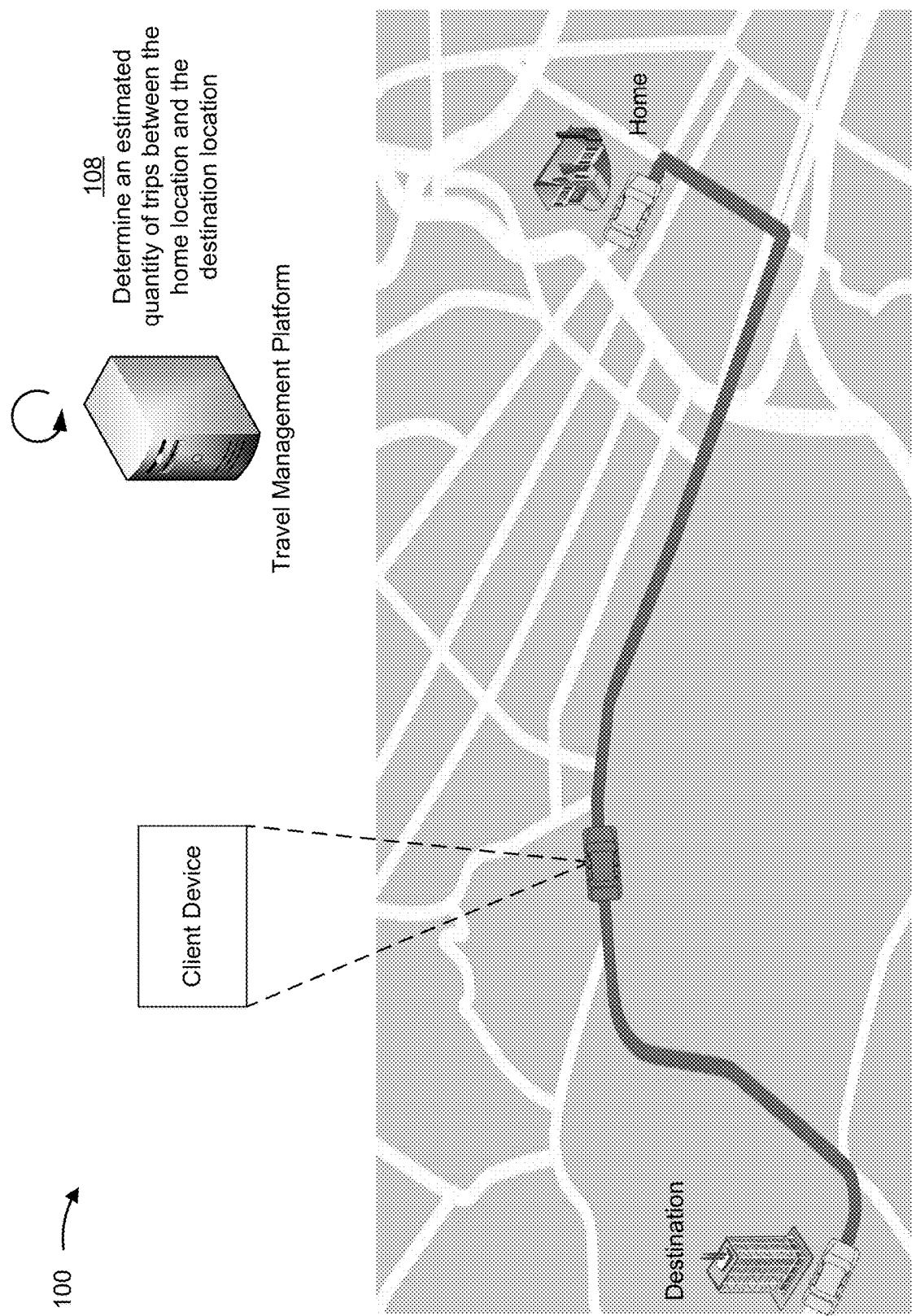

As shown by FIG. 1D, and by reference number 108, the travel management platform can determine, based on the fuel information and the estimated fuel usage, an estimated quantity of trips between the home location and the destination location. The travel management platform can determine, based on the fuel information, an amount of fuel remaining for the vehicle. The travel management platform can determine the estimated quantity of trips remaining for the vehicle based on the estimated fuel usage. In some implementations, the travel management platform can determine a different estimated quantity of trips from the home location to the destination location from an estimated quantity of trips from the destination location to the home location. For example, the travel management platform can determine the different estimated quantity of trips based on different routes being taken from the home location to the work location than vice versa, driving behavior information showing increased fuel usage based on change in traffic from one direction to the other, and/or the like.

In some implementations, the travel management platform can adjust the estimated quantity of trips based on driving behavior information. For example, the travel management platform can change or adjust the estimated quantity of trips between the home location and the destination location based on fuel information, determining a refueling event, driving behavior information of the user, and/or the like. The travel management platform can use information from other users with similar driving behavior information or location information to determine the estimated quantity of trips between the home location and the destination location.

Figure 1E:
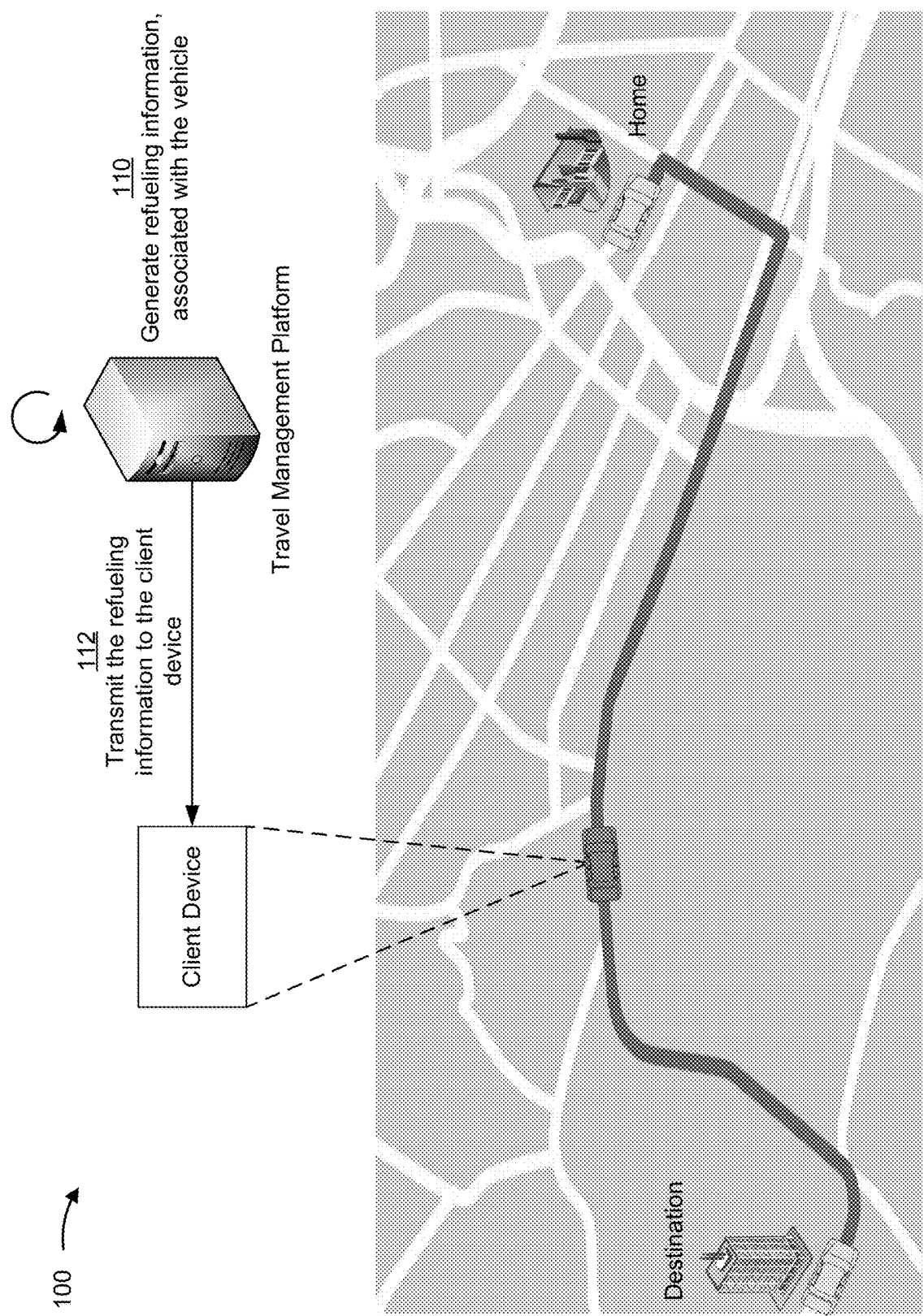

As shown by FIG. 1E, and by reference number 110, the mapping platform can generate refueling information, associated with the vehicle, based on the driving behavior information and the estimated quantity of trips between the home location and the destination location, based on the user's driving behavior, and/or the like. In some implementations, the refueling information can include information identifying when and where to refuel the vehicle, such as information identifying the estimated quantity of trips between the home location and the destination location for the amount of fuel remaining in the vehicle, information identifying a recommended refueling time (e.g., a date and/or time of day to refuel), information identifying a recommended refueling location (e.g., a recommended refueling location near the home location based on the recommended refueling time, a recommended refueling location near the destination location based on the recommended refueling time, and/or the like), and/or the like. For example, the refueling information can include information identifying that the vehicle can travel three trips between the home location and the destination location before refueling, can include information identifying that the vehicle is recommended to be refueled on a Tuesday near the home location before traveling to the destination location, can include information identifying a charging station near the home location with the lowest charging prices near the home location, and/or the like. In some implementations, generating refueling information can be based on the driving behavior information associated with the user, driving behavior information associated with other users, and/or the like.

The travel management platform can generate the refueling information based on the recommended refueling location being located within a particular distance from at least one of the home location or the destination location. In some implementations, the travel management platform can determine the recommended refueling location based on historical refueling information, associated with the user, included in the driving behavior information. In some implementations, the travel management platform can generate the recommended refueling location based on fuel price information associated with the recommended refueling location, such as identifying lowest price, a lowest price associated with user's discounts or memberships, and/or the like.

In some implementations, the travel management platform can use machine learning (e.g., Gradient Boost Regression, etc.) to generate refueling information. The travel management platform can extract trip attributes from the location information and driving behavior information, such as historical information identifying hours remaining until refueling, a start time for the trip, an end time for the trip, a fuel level associated with the end of a trip, a day of the week associated with the trip, miles traveled from a last refueling event, amount of fuel used from the last refueling event, number of trips from the home location to the destination location or vice versa made from the last refueling event, vehicle information identifying the make, model, year, and/or the like of the vehicle, information identifying similarity (e.g., a cluster identification for the user identifying the user with cluster of users with similar driving behavior information or location information, etc.), and/or the like. In some implementations, the travel management platform can extract other types of vehicle information from various sensors installed on the vehicle, such as tire pressure information, vehicle health information (e.g., a quantity of miles until the engine oil of the vehicle should be changed, break wear, windshield a wiper fluid level, and/or the like), and/or the like, and may use the other types of vehicle information to provide notifications of the user (e.g., to recommend performing maintenance on the vehicle, to provide vehicle health warnings, and/or the like).

The travel management platform can generate labels for the refueling information, such as time remaining before the next refuel, trips remaining before the next refuel, and/or the like. The travel management platform can use a training test split to split collected information into a training data set and test data set. The travel management platform can use data preprocessing, such as one-hot encoding, to transform categorical values, such as the day of the week of the trip, the make, model, year of the vehicle, and/or the like, into numerical data. The travel management platform can apply machine learning techniques (e.g., Gradient Boost Regression Machine Learning, etc.) to build a model. The travel management platform can continue training the model with new data based on the accuracy satisfying a threshold accuracy, or save statistics and persist the data.

In some implementations, the travel management platform can generate the refueling information based on the driving behavior information associated with one or more other users, wherein the driving behavior information associated with the one or more other users is selected based on a similarity of the driving behavior information associated with the one or more other users and the driving behavior information associated with the user. In some implementations, the travel management platform can use machine learning to cluster data from other users. For example, the travel management platform can cluster data from users with similar home and/or destination location information, similar driving behavior information, similar refueling information, and/or the like. The travel management platform can set cluster identifiers based on grouping similar information. The travel management platform can calculate an accuracy and can use the model to generate the refueling information if the accuracy satisfies the threshold accuracy, or retrain the model with new data.

In some implementations, the travel management platform can determine the recommended refueling location based on other users using the recommended location through clustering data. For example, the travel management platform can determine the recommended refueling location based on many users using the recommended location, can determine the recommended refueling location based on not many users using the recommended location to provide a less crowded gas station during busy hours, and/or the like.

As further shown in FIG. 1E, and by reference number 112, the travel management platform may transmit the refueling information to the client device. For example, the travel management platform may transmit the refueling information to the client device based on generating the refueling formation, based on the client device requesting the refueling information, and/or the like.

Figure 1F:
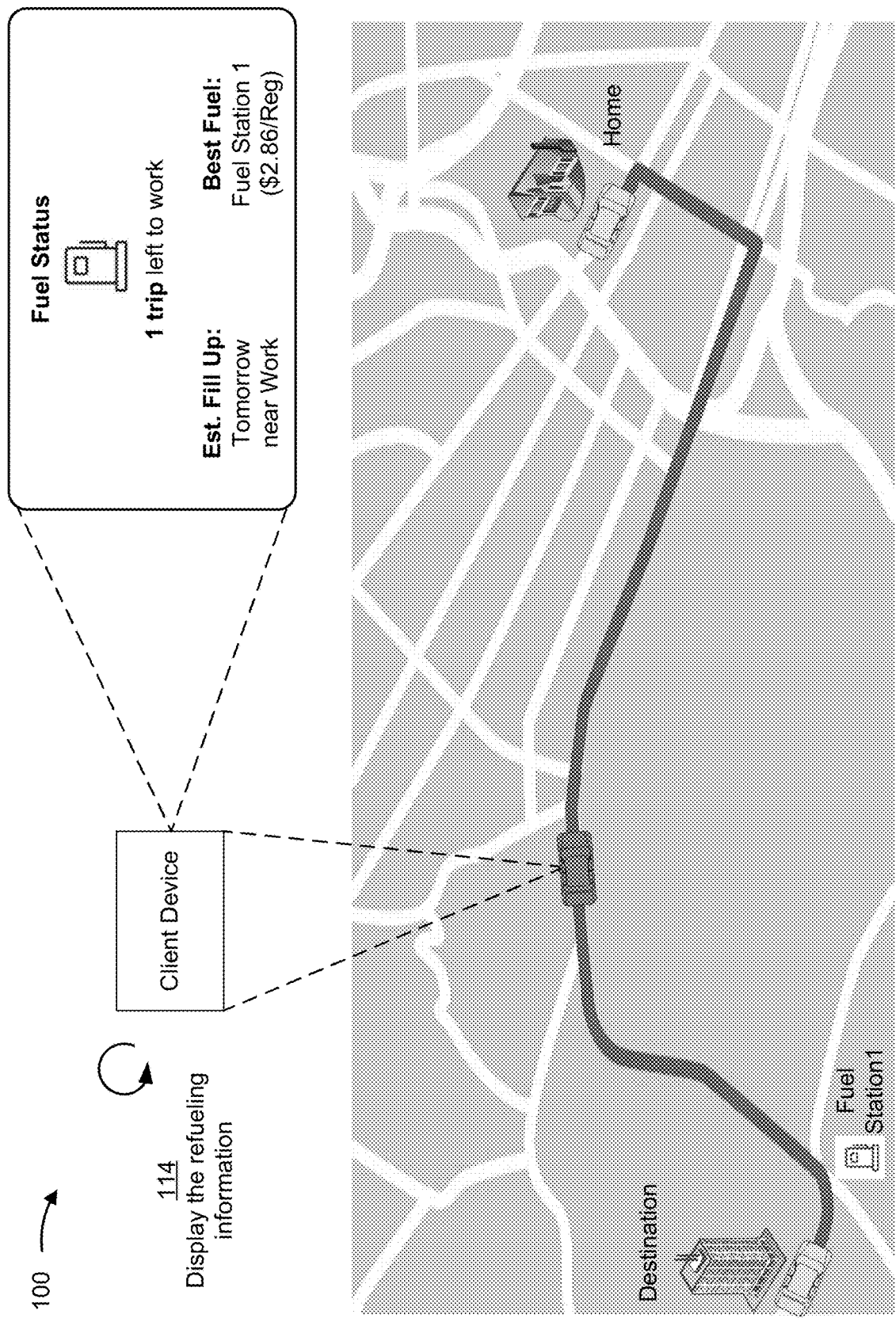

As shown by FIG. 1F, and by reference number 114, the client device can display the refueling information. For example, the client device can display fuel status, number of trips remaining, estimated time or location for refueling, a recommended fuel option, and/or the like. In some implementations, the client device can change the display based on various factors, such as based on client interaction (e.g., if user only selects particular features, if user selects particular features more frequently, etc.), based on a change in the user's driving behavior, based on the user refueling the vehicle, based on time of day, or based on location information. Based on the displayed refueling information, the client device can track the vehicle to determine whether, when, and/or where a refueling event for the vehicle occurs in accordance with the displayed refueling information. The travel management platform can capture subsequent visits to the recommended refueling locations and use the information to retrain the machine learning models to improve the prediction accuracy. Based on the visits to the recommended gas stations, the travel management platform can provide the user with insights on the user's fuel usage patterns and fuel cost savings.

In this way, the travel management platform can provide advanced refueling information on when and where to refuel the vehicle, removing human subjectivity and waste from the process. Additionally, this can improve speed and efficiency of the process and conserve computing resources (e.g., processor resources, memory resources, and/or the like) that would otherwise have been used to identify a refueling location, generate navigation instructions to the refueling location, and/or the like. In this way, implementations described herein use a rigorous, computerized process to perform tasks or roles that were not previously performed or were previously performed using subjective human intuition or input, such as determining an optimal time and place to refuel, determining the most cost-effective location and time to refuel, and/or the like. Automating the process for determining when and where to refuel the vehicle conserves computing resources, such as processor resources, memory resources, and/or the like, that would otherwise be wasted in attempting to determine the best times and locations for refueling the vehicle.

Figure 2B:
Figure 2C:
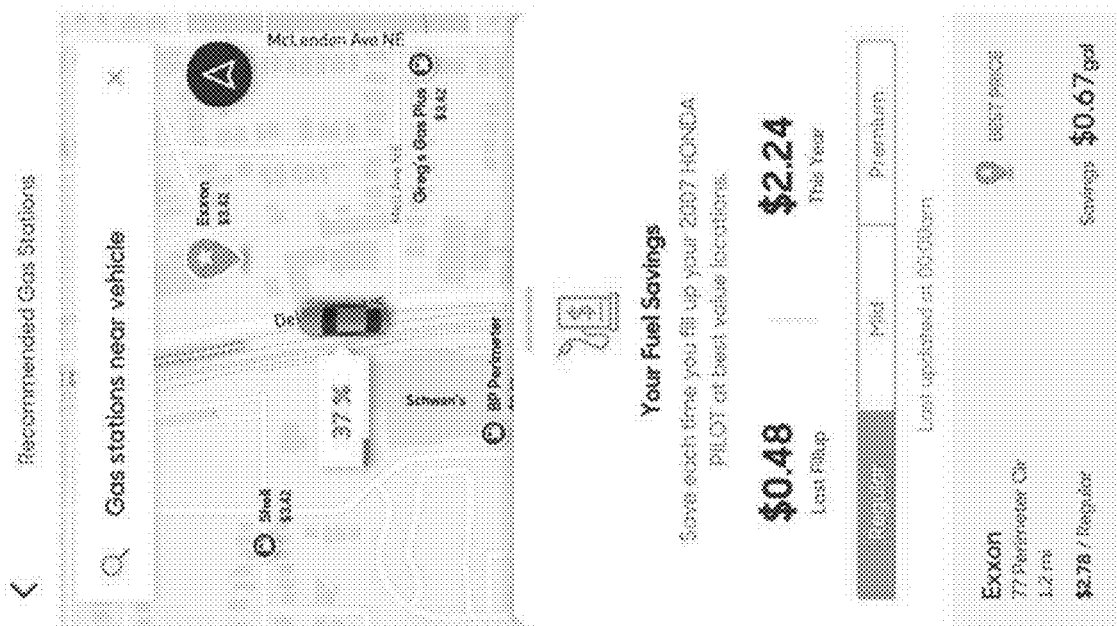

FIGS. 2A-2C are diagrams of example views of a graphical user interface (GUI). In some implementations, a client device, can generate and/or display the GUI. In some implementations, the client device can be associated with a user and a vehicle.

As shown in FIG. 2A, the GUI can display, in an example view 210, information about the vehicle and location information of the vehicle. For example, view 210 can include a representation of vehicle information, such as a make of the vehicle, a model of the vehicle, a year of manufacture of the vehicle, and/or the like. View 210 can also include a representation of information indicating an address associated with the vehicle location, a map fragment associated with the location information, and/or the like. In some implementations, view 210 can include a representation of parking information of the vehicle, including time information indicating when the vehicle is associated with being parked.

As further shown in FIG. 2A, the GUI can display, in example view 220, a representation of driving behavior information associated with the device. For example, view 220 can include a representation of the distance driven by the user in a particular amount of time, the fuel used in a particular amount of time, and the maximum speed associated with the vehicle in a particular span of time.

As shown in FIG. 2B, the GUI can display example view 230, which can include a representation of fueling information and refueling information associated with the vehicle. For example, view 230 can include a representation of the estimated number of miles left until the tank is empty, an estimated number of trips left to the destination location, and/or the like. In some implementations, view 230 can include a representation of refueling information identifying a recommended time to refuel and a recommended location to refuel. In some implementations, view 230 can include a representation of a recommended refueling location based on price.

As shown in FIG. 2C, the GUI display an example view 240, which can include a representation of fuel information and refueling information associated with the vehicle. For example, view 240 can include a representation of a map fragment associated with the current location of the vehicle, along with one or more refueling stations, and pricing information associated with the one or more refueling stations, within a particular distance (e.g., a 5 mile radius, a 10 mile radius, and/or the like) of the current location of the vehicle. View 240 can also include a representation of a recommended refueling location, an address associated with the recommended refueling location, distance information from the current location of the client device to the address, price information associated with fuel provided by the refueling location, and/or the like. View 240 can also include a representation of fuel savings information that includes information identifying a difference in price between the recommended refueling location and other refueling locations near the recommended refueling location, between the recommended refueling location and the costliest refueling location within the particular distance, and/or the like. View 240 can also include a representation of fuel information identifying one or more fuel types associated with the vehicle.

As indicated above, FIGS. 2A-2C are provided merely as an example. Other examples are possible and can differ from what was described with regard to FIGS. 2A-2C.

Figure 3:
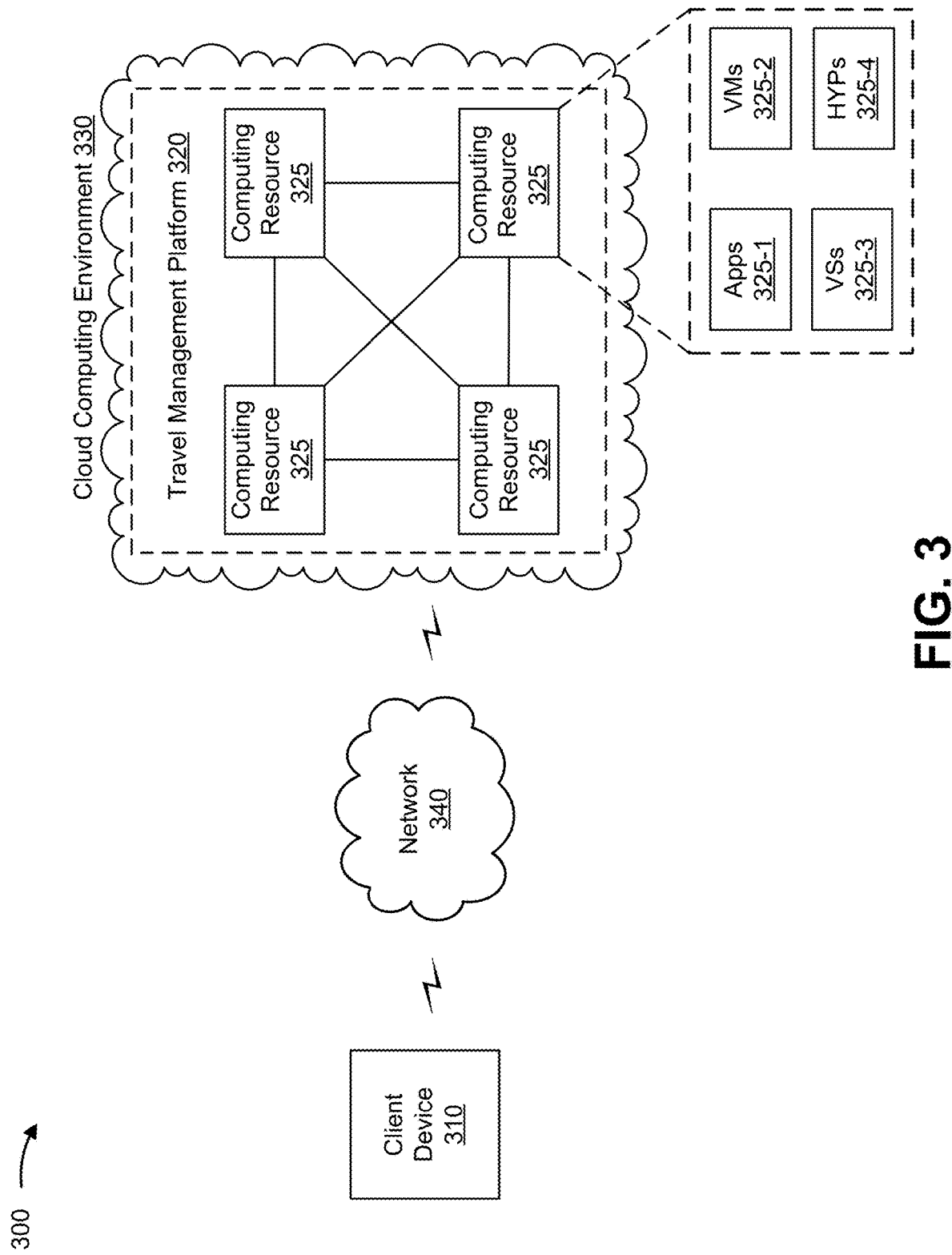
FIG. 3 is a diagram of an example environment in which systems and/or methods, described herein, can be implemented.

FIG. 3 is a diagram of an example environment 300 in which systems and/or methods, described herein, can be implemented. As shown in FIG. 3, environment 300 can include a client device 310, a travel management platform 320, a computing resource 325, a cloud computing resource 325, and a network 340. Devices of environment 300 can interconnect via wired connections, wireless connections, or a combination of wired and wireless connections.

Client device 310 includes one or more devices capable of receiving, generating, storing, processing, and/or providing information associated with providing refueling information to a client device. In some implementations, client device 310 can include a device capable of determining a location of client device 310, such as through geographic positioning coordinates, road information, and/or the like, and providing information, identifying the location, to travel management platform 320. In some implementations, client device 310 can include a device capable of providing fuel information associated with the vehicle and/or driving behavior information associated with the user of the vehicle. Client device can include a device integrated into a vehicle or separate from the vehicle, such as a mobile phone (e.g., a smart phone, etc.), a laptop computer, a tablet computer, a wearable communication device (e.g., a smart wristwatch, a pair of smart eyeglasses, etc.), or a similar type of device.

Travel management platform 320 includes one or more computing resources assigned to provide refueling information to a client device. For example, travel management platform 320 can be a platform implemented by cloud computing environment 330 that can receive fuel information and location information associated with the vehicle, determine a home location associated with a user of the client device and a destination location associated with the user, determine an estimated fuel usage, of the vehicle, associated with a route between the home location and the destination location, determine an estimated quantity of trips between the home location and the destination location, generate refueling information associated with the vehicle, transmit the refueling information to the client device, and/or the like. In some implementations, travel management platform 320 is implemented by computing resources 325 of cloud computing environment 330.

Travel management platform 320 can include a server device or a group of server devices. In some implementations, travel management platform 320 can be hosted in cloud computing environment 330. Notably, while implementations described herein describe travel management platform 320 as being hosted in cloud computing environment 330, in some implementations, travel management platform 320 may not be cloud-based or can be partially cloud-based.

Cloud computing environment 330 includes an environment that delivers computing as a service, whereby shared resources, services, etc. can be provided to travel management platform 320. Cloud computing environment 330 can provide computation, software, data access, storage, and/or other services that do not require end-user knowledge of a physical location and configuration of a system and/or a device that delivers the services. As shown, cloud computing environment 330 can include travel management platform 320 and computing resource 325.

Computing resource 325 includes one or more personal computers, workstation computers, server devices, or another type of computation and/or communication device. In some implementations, computing resource 325 can host travel management platform 320. The cloud resources can include compute instances executing in computing resource 325, storage devices provided in computing resource 325, data transfer devices provided by computing resource 325, etc. In some implementations, computing resource 325 can communicate with other computing resources 325 via wired connections, wireless connections, or a combination of wired and wireless connections.

As further shown in FIG. 3, computing resource 325 can include a group of cloud resources, such as one or more applications ("APPs") 325-1, one or more virtual machines ("VMs") 325-2, virtualized storage ("VSs") 325-3, one or more hypervisors ("HYPs") 325-4, or the like.

Application 325-1 includes one or more software applications that can be provided to or accessed by client device 310. Application 325-1 can eliminate a need to install and execute the software applications on client device 310. For example, application 325-1 can include software associated with travel management platform 320 and/or any other software capable of being provided via cloud computing environment 330. In some implementations, one application 325-1 can send/receive information to/from one or more other applications 325-1, via virtual machine 325-2.

Virtual machine 325-2 includes a software implementation of a machine (e.g., a computer) that executes programs like a physical machine. Virtual machine 225-2 can be either a system virtual machine or a process virtual machine, depending upon use and degree of correspondence to any real machine by virtual machine 325-2. A system virtual machine can provide a complete system platform that supports execution of a complete operating system ("OS"). A process virtual machine can execute a single program, and can support a single process. In some implementations, virtual machine 325-2 can execute on behalf of a user (e.g., client device 310), and can manage infrastructure of cloud computing environment 330, such as data management, synchronization, or long-duration data transfers.

Virtualized storage 325-3 includes one or more storage systems and/or one or more devices that use virtualization techniques within the storage systems or devices of computing resource 325. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 325-4 provides hardware virtualization techniques that allow multiple operating systems (e.g., "guest operating systems") to execute concurrently on a host computer, such as computing resource 325. Hypervisor 325-4 can present a virtual operating platform to the guest operating systems, and can manage the execution of the guest operating systems. Multiple instances of a variety of operating systems can share virtualized hardware resources.

Network 340 includes one or more wired and/or wireless networks. For example, network 340 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there can be additional devices and/or networks, fewer devices and/or networks, different devices and/or networks, or differently arranged devices and/or networks than those shown in FIG. 3. Furthermore, two or more devices shown in FIG. 3 can be implemented within a single device, or a single device shown in FIG. 3 can be implemented as multiple, distributed devices. Additionally, or alternatively, a set of devices (e.g., one or more devices) of environment 300 can perform one or more functions described as being performed by another set of devices of environment 300.

Figure 4:
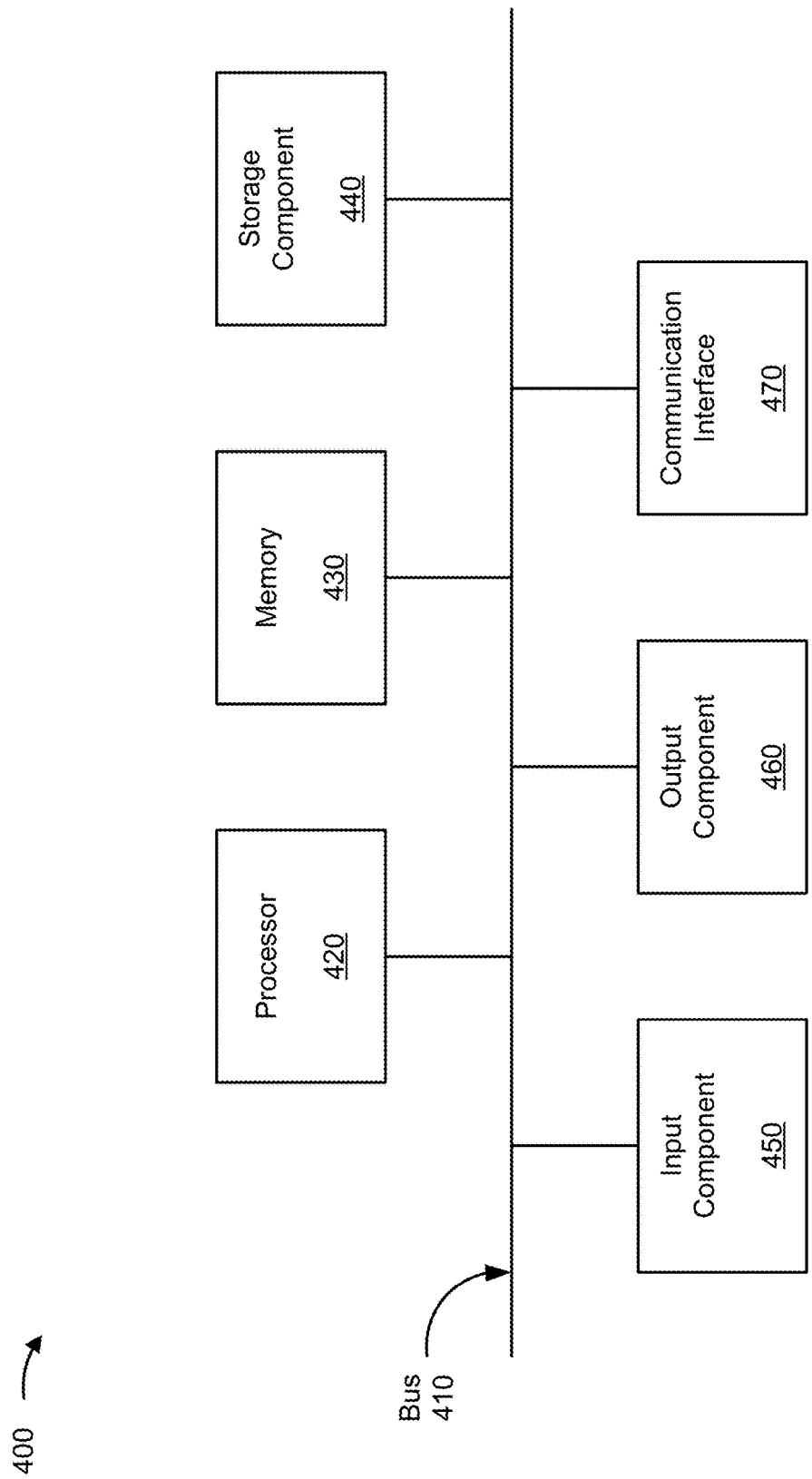
FIG. 4 is a diagram of example components of one or more devices of FIG. 3.

FIG. 4 is a diagram of example components of a device 400. Device 400 can correspond client device 310, travel management platform 320, and/or computing resource 325. In some implementations client device 310, travel management platform 320, and/or computing resource 325 can include one or more devices 400 and/or one or more components of device 400. As shown in FIG. 4, device 400 can include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 can include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a wireless local area network interface, a cellular network interface, or the like.

Device 400 can perform one or more processes described herein. Device 400 can perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

Figure 5:
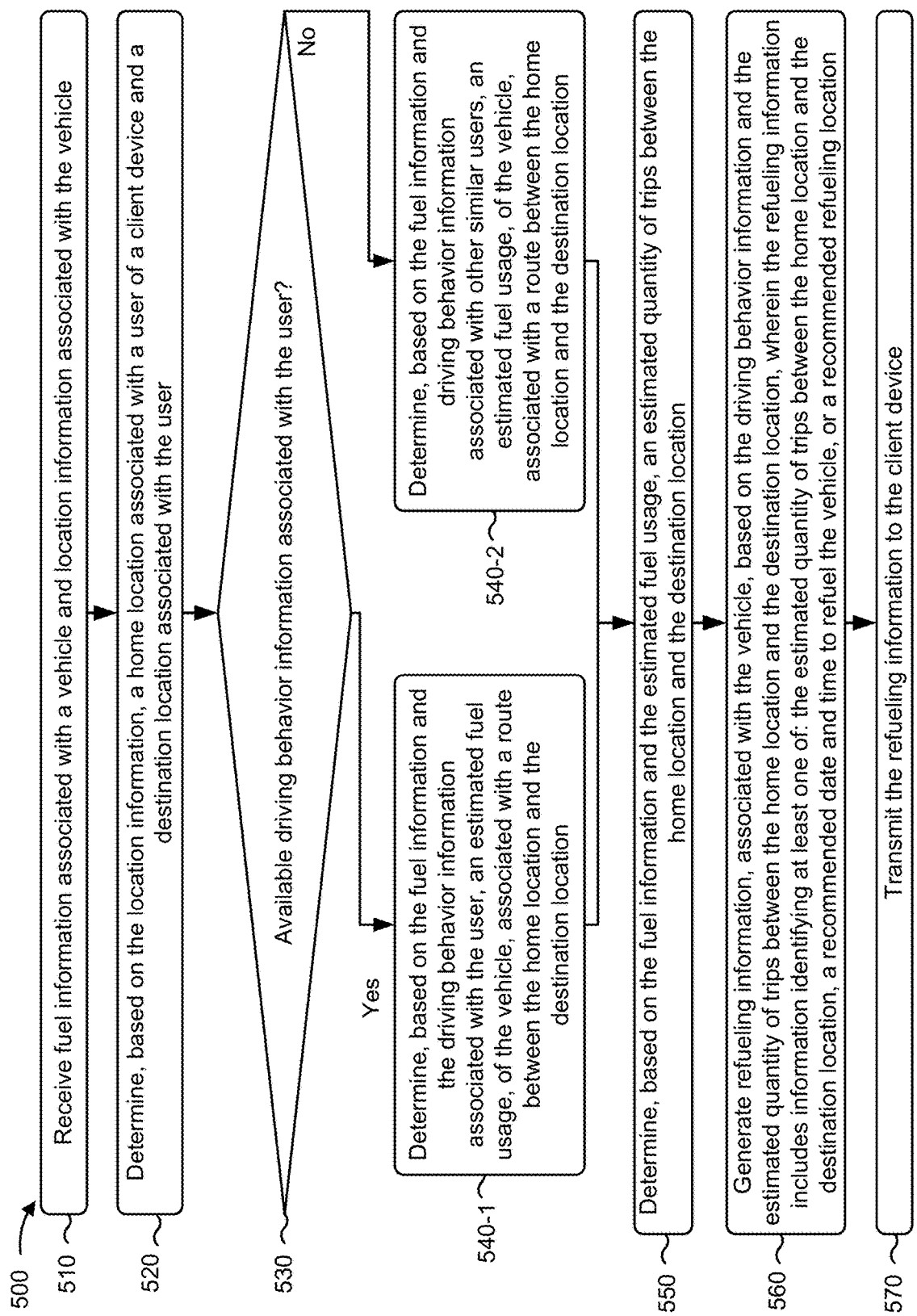
FIG. 5 is a flow chart of an example process for providing refueling information to a client device.

FIG. 5 is a flow chart of an example process 500 for providing refueling information to a client device. In some implementations, one or more process blocks of FIG. 5 can be performed by a travel management platform (e.g., travel management platform 320). In some implementations, one or more process blocks of FIG. 5 can be performed by another device or a group of devices separate from or including travel management platform, such as a client device (e.g., client device 310), and/or another device.

As shown in FIG. 5, process 500 can include receiving fuel information associated with a vehicle and location information associated with the vehicle (block 510). For example, the travel management platform (e.g., using processor 420, memory 430, storage component 440, input component 450, and/or the like) can receive fuel information associated with a vehicle and location information associated with the vehicle, as described above in connection with FIGS. 1A-1F. In some implementations, the information associated with the vehicle can include information such as make, model, and year of the vehicle, fuel economy information associated with the vehicle, fuel capacity of the vehicle, and/or the like.

As further shown in FIG. 5, process 500 can include determining, based on the location information, a home location associated with a user of a client device and a destination location associated with the user (block 520). For example, the travel management platform (e.g., using processor 420, memory 430, storage component 440, and/or the like) can determine, based on the location information, a home location associated with a user of a client device and a destination location associated with the user, as described above in connection with FIGS. 1A-1F.

As further shown in FIG. 5, process 500 can include determining whether driving behavior information, associated with the user, is available for determining an estimated fuel usage of the vehicle (block 530). For example, the travel management platform (e.g., using processor 420, memory 430, storage component 440, and/or the like) can determine whether driving behavior information, associated with the user, is available for determining an estimated fuel usage of the vehicle.

As further shown in FIG. 5, based on determining driving behavior information associated with the user is available (block 530—Yes), process 500 can include determining, based on the fuel information and the driving behavior information associated with the user, an estimated fuel usage, of the vehicle, associated with a route between the home location and the destination location (block 540-1). For example, the travel management platform (e.g., using processor 420, memory 430, storage component 440, and/or the like) can determine, based on the fuel information and the driving behavior information associated with the user, an estimated fuel usage, of the vehicle, associated with a route between the home location and the destination location, as described above in connection with FIGS. 1A-1F.

As further shown in FIG. 5, based on determining that driving behavior information associated with the user is not available (block 530—No), process 500 can include determining, based on the fuel information and the driving behavior information associated with other similar users, an estimated fuel usage, of the vehicle, associated with a route between the home location and the destination location (block 540-2). For example, the travel management platform (e.g., using processor 420, memory 430, storage component 440, and/or the like) can determine, based on the fuel information and the driving behavior information associated with other similar users, an estimated fuel usage, of the vehicle, associated with a route between the home location and the destination location, as described above in connection with FIGS. 1A-1F. In this way, the travel management platform can determine the estimated fuel usage of the vehicle based on the driving behavior information of other similar users, and can collect driving behavior information for the user over a period of time (e.g., 30 days, 3 months, and/or the like) such that the travel management platform can use the collected driving behavior information for the user to estimate the fuel usage of the vehicle in the future.

As further shown in FIG. 5, process 500 can include determining, based on the fuel information and the estimated fuel usage, an estimated quantity of trips between the home location and the destination location (block 550). For example, the travel management platform (e.g., using processor 420, memory 430, storage component 440, and/or the like) can determine, based on the fuel information and the estimated fuel usage, an estimated quantity of trips between the home location and the destination location, as described above in connection with FIGS. 1A-1F.

As further shown in FIG. 5, process 500 can include generating refueling information, associated with the vehicle, based on the driving behavior information and the estimated quantity of trips between the home location and the destination location, wherein the refueling information includes information identifying at least one of: the estimated quantity of trips between the home location and the destination location, a recommended date and time to refuel the vehicle, or a recommended refueling location (block 560). For example, the travel management platform (e.g., using processor 420, memory 430, storage component 440, and/or the like) can generate refueling information, associated with the vehicle, based on the driving behavior information and the estimated quantity of trips between the home location and the destination location, wherein the refueling information includes information identifying at least one of: the estimated quantity of trips between the home location and the destination location, a recommended date and time to refuel the vehicle, or a recommended refueling location, as described above in connection with FIGS. 1A-1F.

As further shown in FIG. 5, process 500 can include transmitting the refueling information to the client device (block 570). For example, the travel management platform (e.g., using processor 420, memory 430, storage component 440, output component 460, and/or the like can transmit the refueling information to the client device, as described above in connection with FIGS. 1A-1F.

Process 500 can include additional implementations, such as any single implementation or any combination of implementations described below and/or in connection with one or more other processes described elsewhere herein.

In some implementations, wherein determining the home location and the destination location, the travel management platform can determine, based on the location information, at least one of: that a particular location of the vehicle remains the same or substantially similar for a time period that satisfies a threshold time period, that the time period is associated with a particular time window of one or more days, or that the vehicle is located at the particular location during the particular time window for a quantity of days that satisfies a threshold quantity of days; and determine at least one of the home location or the destination location based on at least one of: determining that the particular location of the vehicle remains the same or substantially similar for the time period that satisfies the threshold time period, determining that the time period is associated with the particular time window of one or more days, or determining that the vehicle is located at the particular location during the particular time window for the quantity of days that satisfies the threshold quantity of days.

In some implementations, the travel management platform can determine the recommended refueling location based on at least one of: the recommended refueling location being located within a particular distance from at least one of: the home location or the destination location, historical refueling information, associated with the user, included in the driving behavior information, or fuel price information associated with the recommended refueling location.

In some implementations, the driving behavior information can include refueling behavior information associated with the user; the refueling behavior information can include information identifying one or more refueling events associated with the vehicle; and the travel management platform can identify a refueling event, of the one or more refueling events, by determining that the vehicle has entered a point of interest associated with a refueling station, determining a first fuel level of the vehicle when the vehicle entered the point of interest, determining a second fuel level of the vehicle after the vehicle leaves the point of interest, and determining that the refueling event occurred based on the second fuel level being greater relative to the first fuel level, which can indicate that the user refueled the vehicle at the refueling station.

In some implementations, when generating the refueling information, the travel management platform can generate the refueling information based on driving behavior information associated with one or more other users, wherein the driving behavior information associated with the one or more other users is selected based on a similarity of the driving behavior information associated with the one or more other users and the driving behavior information associated with the user.

In some implementations, the driving behavior information can include at least one of: acceleration information associate with the user, average speed information associated with the user, an amount of driving time associated with the user, historical route information associated with the user, or historical refueling information associated with the user.

In some implementations, the fuel information can include at least one of: information identifying a type of fuel associated with the vehicle, information identifying a fuel level associated with the vehicle, or information identifying an average fuel economy associated with the vehicle.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

Figure 6:
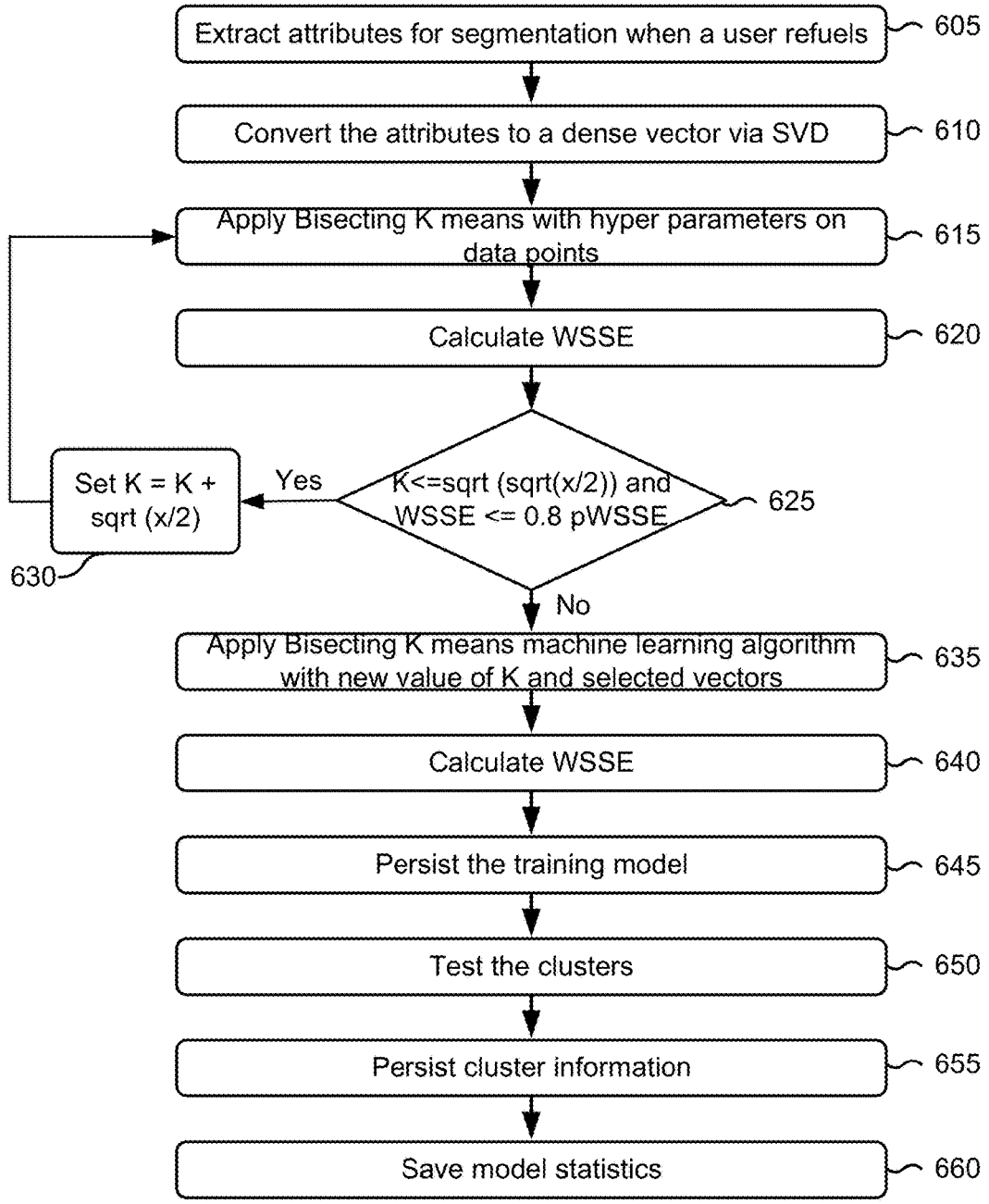
FIG. 6 is a flow chart of an example process for segmenting users based on similar refueling information.

FIG. 6 is a flow chart of an example process 600 for segmenting similar users based on refueling patterns. In some implementations, one or more process blocks of FIG. 6 can be performed by the travel management platform (e.g., travel management platform 320). In some implementations, one or more process blocks of FIG. 6 can be performed by another device or a group of devices separate from or including the travel management platform, such as a client device (e.g., client device 310).

As shown in FIG. 6, process 600 can include extracting attributes for segmentation when a user refuels (block 605). For example, travel management platform (e.g., using processor 420, memory 430, storage component 440, input component 450, and/or the like) can extract attributes for segmentation when a user refuels. In some implementations, the attributes can include a fuel level before refueling, a day of the week associated with refueling events, total moving time of the vehicle from a previous refueling event, total time the vehicle was idle from a previous refueling event, time elapsed since last refueling event, distance traveled since last refueling event, a preferred refueling location, and/or the like.

As shown in FIG. 6, process 600 can include converting the attributes to a dense vector or matrix format for use in a machine learning model, such as converting the attributes to a dense vector via singular value decomposition (SVD) (block 610). For example, travel management platform (e.g., using processor 420, memory 430, storage component 440, and/or the like) can convert the attributes to a dense vector via singular value decomposition.

As shown in FIG. 6, process 600 can include applying a machine learning algorithm, such as the Bisecting K means algorithm with hyper parameters on data points (block 615). For example, travel management platform (e.g., using processor 420, memory 430, storage component 440, and/or the like) can apply Bisecting K means with hyper parameters on data points.

As shown in FIG. 6, process 600 can include calculating a within sum of squared error (WSSE) according to equation (1):

$$WSSE = \Sigma[x - \text{mean}(x)]^2 \qquad (1)$$

(block 620). For example, travel management platform (e.g., using processor 420, memory 430, storage component 440, and/or the like) can calculate a WSSE.

As shown in FIG. 6, process 600 can include applying a customized elbow method to determine the appropriate value of K, according to equation (2), for accurately applying the Bisecting K Means machine learning algorithm:

$$K \leq \sqrt{\sqrt{\frac{x}{2}}}, \qquad (2)$$

$$WSSE \leq 0.8\, pWSSE \qquad (3)$$

(block 625). For example, travel management platform e.g., using processor 420, memory 430, storage component 440, and/or the like) can apply a customized elbow method to determine the appropriate value of K for accurately applying the Bisecting K Means machine learning algorithm. The travel management platform can increment the value of K every iteration until the WSSE is less than 20% of the previous pWSSE.

As shown in FIG. 6, process 600 can include an iterative process of applying Bisecting K means by incrementing the value of K every iteration through equation (4):

$$K = K + \sqrt{\frac{x}{2}} \qquad (4)$$

(block 630). For example, travel management platform (e.g., using processor 420, memory 430, storage component 440, and/or the like) can include an iterative process of applying Bisecting K means by incrementing the value of K every iteration.

As shown in FIG. 6, process 600 can include applying the new K value and selected vectors (block 635). For example, travel management platform (e.g., using processor 420, memory 430, storage component 440, and/or the like) can apply the new K value and selected vectors.

As shown in FIG. 6, process 600 can include calculating a WSSE (block 640). For example, travel management platform (e.g., using processor 420, memory 430, storage component 440, and/or the like) can calculate a WSSE.

As shown in FIG. 6, process 600 can include persisting the training model (block 645). For example, travel management platform (e.g., using processor 420, memory 430, storage component 440, and/or the like) can persist the training model.

As shown in FIG. 6, process 600 can include testing the formed clusters (block 650). For example, travel management platform (e.g., using processor 420, memory 430, storage component 440, and/or the like) can test the formed clusters using domain knowledge and manual verification of sample data.

As shown in FIG. 6, process 600 can include persisting the cluster information (block 655). For example, travel management platform (e.g., using processor 420, memory 430, storage component 440, and/or the like) can persist the cluster information.

As shown in FIG. 6, process 600 can include saving model statistics (block 660). For example, travel management platform (e.g., using processor 420, memory 430, storage component 440, and/or the like) can save model statistics. In some implementations, the travel management platform can then assign a cluster identifier to each user. Each cluster can consist of a threshold number of users that possess similar driving behavior.

Although FIG. 6 shows example blocks of process 600, in some implementations, process 600 can include additional blocks, fewer blocks, different blocks, or differently arranged blocks than those depicted in FIG. 6. Additionally, or alternatively, two or more of the blocks of process 600 can be performed in parallel.

Figure 7:
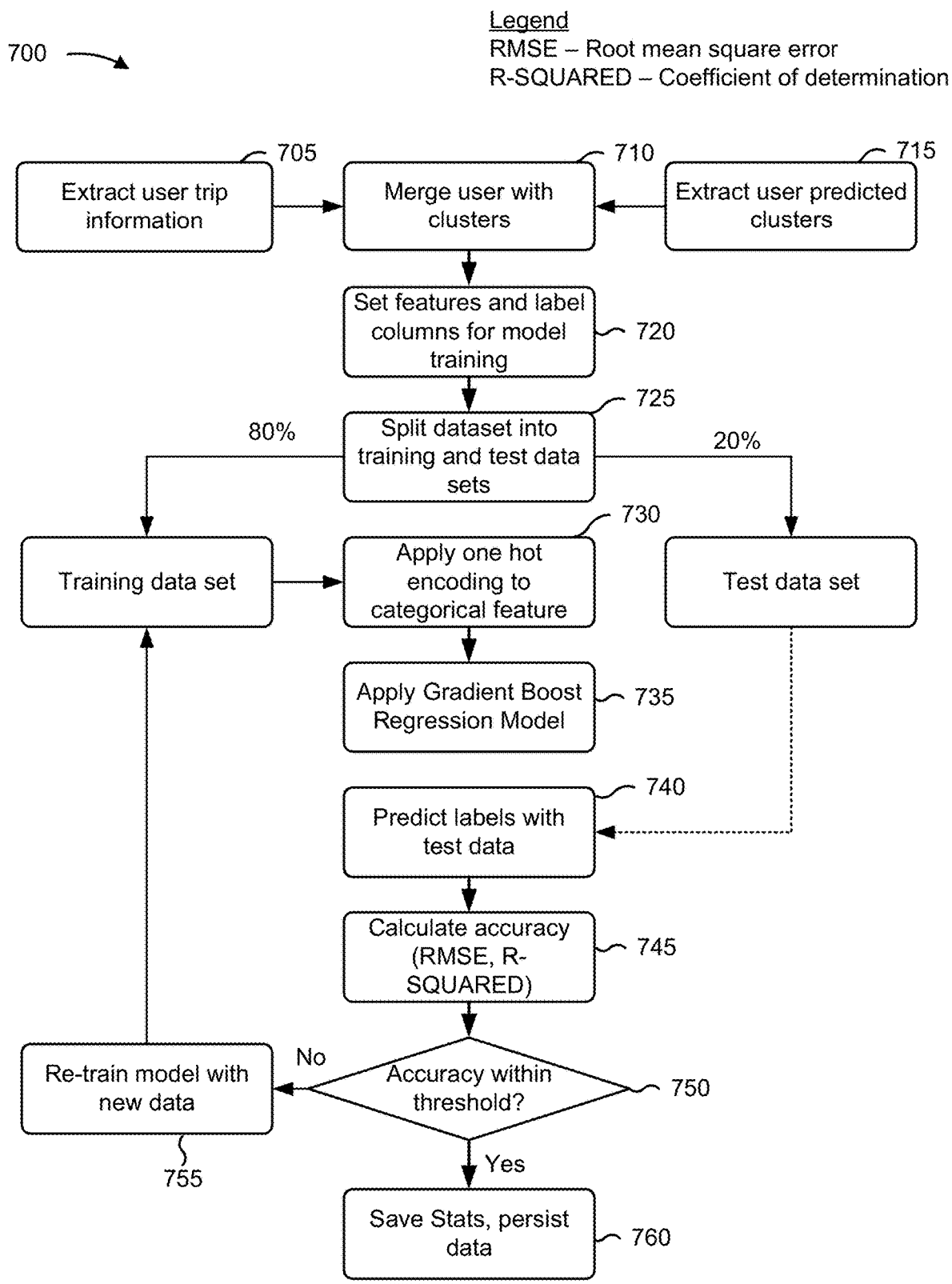
FIG. 7 is a flow chart of an example process for determining refueling information.

FIG. 7 is a flow chart of an example process 700 for determining refueling information. In some implementations, one or more process blocks of FIG. 7 can be performed by the travel management platform (e.g., travel management platform 320). In some implementations, one or more process blocks of FIG. 7 can be performed by another device or a group of devices separate from or including the travel management platform, such as a client device (e.g., client device 310).

As shown in FIG. 7, process 700 can include extracting user trip information (block 705). For example, travel management platform (e.g., using processor 420, memory 430, storage component 440, and/or the like) can extract user trip information.

As shown in FIG. 7, process 700 can include merging user with clusters (block 710). For example, travel management platform (e.g., using processor 420, memory 430, storage component 440, and/or the like) can merge the user with clusters.

As shown in FIG. 7, process 700 can include extracting user predicted clusters (block 715). For example, travel management platform (e.g., using processor 420, memory 430, storage component 440, and/or the like) can extract user predicted clusters.

As shown in FIG. 7, process 700 can include setting features and labeling columns for model training (block 720). For example, travel management platform (e.g., using processor 420, memory 430, storage component 440, and/or the like) can set features and label columns for model training.

As shown in FIG. 7, process 700 can include splitting a dataset into training and test data sets (block 725). For example, travel management platform (e.g., using processor 420, memory 430, storage component 440, and/or the like) can split a dataset into training and test data sets.

As shown in FIG. 7, process 700 can include applying one hot encoding to a categorical feature (block 730). For example, travel management platform (e.g., using processor 420, memory 430, storage component 440, and/or the like) can apply one hot encoding to a categorical feature.

As shown in FIG. 7, process 700 can include applying a gradient boost regression model (block 735). For example, travel management platform (e.g., using processor 420, memory 430, storage component 440, and/or the like) can apply a gradient boost regression model.

As shown in FIG. 7, process 700 can include predicting labels with test data (block 740). For example, travel management platform (e.g., using processor 420, memory 430, storage component 440, and/or the like) can predict labels with test data.

As shown in FIG. 7, process 700 can include calculating accuracy of the model (block 745). For example, travel management platform (e.g., using processor 420, memory 430, storage component 440, and/or the like) can calculate accuracy of the model as a root mean square error (RMSE), a coefficient of determination ($R^2$ or R-SQUARED), an accuracy percentage, and/or the like.

As shown in FIG. 7, process 700 can include determining whether the accuracy of the model satisfies a threshold accuracy (block 750). For example, travel management platform (e.g., using processor 420, memory 430, storage component 440, and/or the like) can determine whether the accuracy of the model satisfies a threshold accuracy. In some implementations, the threshold accuracy can include an 80 percent threshold, an 85 percent threshold, and/or the like.

As shown in FIG. 7, process 700 can include retraining the model with new data based on calculating the accuracy of the model and determining that the accuracy does not meet a threshold value (block 755). For example, travel management platform (e.g., using processor 420, memory 430, storage component 440, and/or the like) can retrain the model with new data based on calculating the accuracy of the model and determining that the accuracy does not meet a threshold value.

As shown in FIG. 7, process 700 can including saving the statistics based on the accuracy of the model meeting the threshold value (block 760). For example, travel management platform (e.g., using processor 420, memory 430, storage component 440, and/or the like) can save the statistics based on the accuracy of the model meeting the threshold value.

Although FIG. 7 shows example blocks of process 700, in some implementations, process 700 can include additional blocks, fewer blocks, different blocks, or differently arranged blocks than those depicted in FIG. 7. Additionally, or alternatively, two or more of the blocks of process 700 can be performed in parallel.

Figure 8:
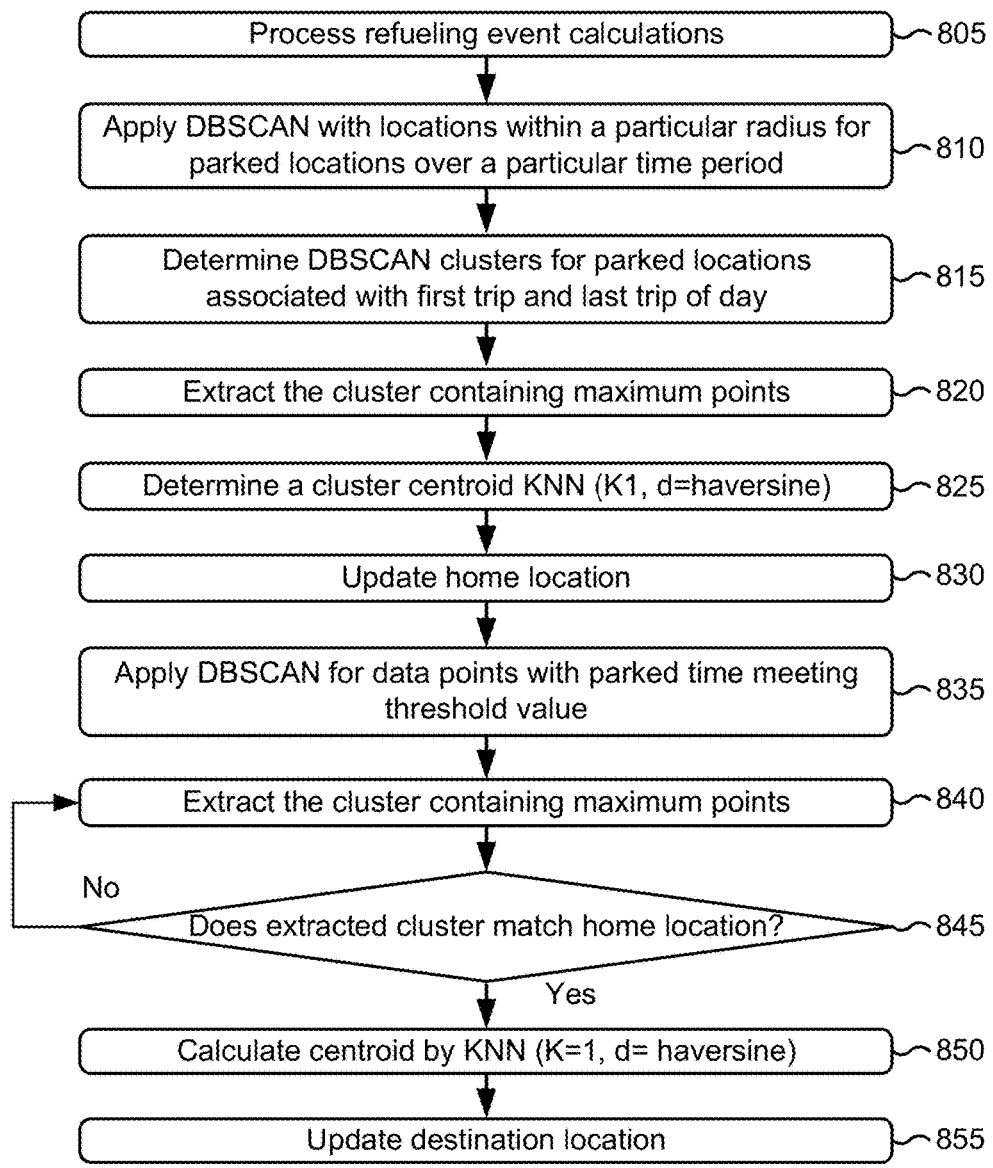
FIG. 8 is a flow chart of an example process for determining home and work locations.

FIG. 8 is a flow chart of an example process 800 for determining home and destination locations. In some implementations, one or more process blocks of FIG. 8 can be performed by the travel management platform (e.g., travel management platform 320). In some implementations, one or more process blocks of FIG. 8 can be performed by another device or a group of devices separate from or including the travel management platform, such as a client device (e.g., client device 310).

As shown in FIG. 8, process 800 can include processing refueling event calculations (block 805). For example, travel management platform (e.g., using processor 420, memory 430, storage component 440, and/or the like) can process refueling event calculations.

As shown in FIG. 8, process 800 can include applying DBSCAN with locations within a particular radius for parked locations over a particular time period (block 810). For example, travel management platform (e.g., using processor 420, memory 430, storage component 440, and/or the like) can apply DBSCAN with locations within a particular radius for parked locations over a particular time period. In some implementations, the radius can be 300 meters, 250 meters, and/or the like. In some implementations, the particular time period can be six months, five months, and/or the like.

As shown in FIG. 8, process 800 can include determining DBSCAN clusters for parked locations associated with the first trip and last trip of a day (block 815). For example, travel management platform (e.g., using processor 420, memory 430, storage component 440, and/or the like) can determine DBSCAN clusters for parked locations associated with the first trip and last trip of a day. In some implementations, the travel management platform can determine DBSCAN clusters for data points with a parked time of over three hours, four hours, and/or the like.

As shown in FIG. 8, process 800 can include extracting the cluster containing maximum points (block 820). For example, travel management platform (e.g., using processor 420, memory 430, storage component 440, and/or the like) can extract the cluster containing maximum points.

As shown in FIG. 8, process 800 can include determining a cluster centroid (block 825). For example, travel management platform (e.g., using processor 420, memory 430, storage component 440, and/or the like) can determine a cluster centroid using a k-nearest neighbor (KNN) algorithm.

As shown in FIG. 8, process 800 can include updating a home location (block 830). For example, travel management platform (e.g., using processor 420, memory 430, storage component 440, and/or the like) can update the home location based on determining the cluster centroid.

As shown in FIG. 8, process 800 can include applying DBSCAN for data points with the parked time meeting a threshold value (block 835). For example, travel management platform (e.g., using processor 420, memory 430, storage component 440, and/or the like) can apply DBSCAN for data points with the parked time meeting a threshold value, such as greater than three hours, to determine possible destination locations As shown in FIG. 8, process 800 can include extracting the cluster containing the maximum points (block 840). For example, travel management platform (e.g., using processor 420, memory 430, storage component 440, and/or the like) can extract the cluster containing the maximum points.

As shown in FIG. 8, process 800 can include determining whether the cluster matches the home location determined in previous steps (block 845). For example, travel management platform (e.g., using processor 420, memory 430, storage component 440, and/or the like) can determine whether the cluster matches the home location determined in previous steps. If the extracted cluster containing maximum points matches the home location, the travel management platform can remove the cluster and extract another cluster containing maximum points.

As shown in FIG. 8, process 800 can include calculating the centroid (block 850). For example, travel management platform (e.g., using processor 420, memory 430, storage component 440, and/or the like) can calculate the centroid.

As shown in FIG. 8, process 800 can include updating the destination location (block 855). For example, travel management platform (e.g., using processor 420, memory 430, storage component 440, and/or the like) can update the destination location.

In this way, a travel management platform (e.g., travel management platform 320) can provide automated information on when and where to refuel the vehicle by removing human subjectivity and waste from the process. Automating the process for determining when and where to refuel the vehicle conserves computing resources (e.g., processor resources, memory resources, and/or the like) that would otherwise be wasted in attempting to determine the best times and locations for refueling the vehicle. In this way, implementations described herein use a rigorous, computerized process to perform tasks or roles that were not previously performed or were previously performed using subjective human intuition or input, such as determining an optimal time and place to refuel, determining the most cost-effective location to refuel, and/or the like. This can improve speed and efficiency of the process and conserve computing resources (e.g., processor resources, memory resources, and/or the like) that would otherwise have been used to identify a refueling location, generate navigation instructions to the refueling location, and/or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, at a travel management platform,
      fuel information associated with a vehicle, and
      location information associated with the vehicle;
   determining, by the travel management platform and based on the location information and using a plurality of machine learning algorithms, a home location associated with a user of a client device and a destination location associated with the user;
   determining, by the travel management platform and based on the fuel information and driving behavior information associated with the user, an estimated fuel usage, of the vehicle, associated with a route between the home location and the destination location;
   determining, by the travel management platform and based on the fuel information and the estimated fuel usage, an estimated quantity of trips between the home location and the destination location available with a fuel supply in the vehicle,
      wherein determining the estimated quantity of trips is based on the fuel information indicating:
         first historic fuel usage information associated with historic travel from the home location to the destination location, and second historic fuel usage information associated with historic travel from the destination location to the home location;

generating, by the travel management platform, refueling information, associated with the vehicle, based on the driving behavior information and the estimated quantity of trips between the home location and the destination location, wherein the refueling information includes information identifying at least one of:

the estimated quantity of trips between the home location and the destination location, a recommended date and time to refuel the vehicle, or a recommended refueling location; and transmitting, by the travel management platform, the refueling information to the client device.

2. The method of claim 1, wherein determining the home location and the destination location comprises:

determining, based on the location information, at least one of:

that a particular location of the vehicle remains the same or substantially similar for a time period that satisfies a threshold time period, that the time period is associated with a particular time window of one or more days, or that the vehicle is located at the particular location during the particular time window for a quantity of days that satisfies a threshold quantity of days; and determining at least one of the home location or the destination location based on at least one of:

determining that the particular location of the vehicle remains the same or substantially similar for the time period that satisfies the threshold time period, determining that the time period is associated with the particular time window of one or more days, or determining that the vehicle is located at the particular location during the particular time window for the quantity of days that satisfies the threshold quantity of days.

3. The method of claim 1, further comprising:

determining the recommended refueling location based on at least one of:

the recommended refueling location being located within a particular distance from at least one of:

the home location, or the destination location, historical refueling information, associated with the user, included in the driving behavior information, or fuel price information associated with the recommended refueling location.

4. The method of claim 1, wherein the driving behavior information comprises:

refueling behavior information associated with the user, wherein the refueling behavior information includes information identifying one or more refueling events associated with the vehicle, and wherein the method further comprises:

identifying a refueling event, of the one or more refueling events, by:

determining that the vehicle has entered a point of interest associated with a refueling station, determining a first fuel level of the vehicle when the vehicle entered the point of interest, determining a second fuel level of the vehicle after the vehicle leaves the point of interest, and determining that the refueling event occurred based on the second fuel level being greater relative to the first fuel level.

5. The method of claim 1, wherein generating the refueling information comprises:

generating the refueling information based on driving behavior information associated with one or more other users, wherein the driving behavior information associated with the one or more other users is selected based on a similarity of the driving behavior information associated with the one or more other users and the driving behavior information associated with the user.

6. The method of claim 1, wherein the driving behavior information comprises at least one of:

acceleration information associated with the user, average speed information associated with the user, an amount of driving time associated with the user, historical route information associated with the user, or historical refueling information associated with the user.

7. The method of claim 1, wherein the fuel information comprises at least one of:

information identifying a type of fuel associated with the vehicle, information identifying a fuel level associated with the vehicle, or information identifying an average fuel economy associated with the vehicle.

8. A device, comprising:

one or more memories; and one or more processors, communicatively coupled to the one or more memories, to:

receive:

fuel information associated with a vehicle, and location information associated with the vehicle;

determine, based on the location information and based on using a plurality of machine learning algorithms, a home location associated with a user of a client device and a destination location associated with the user;

determine, based on the fuel information and driving behavior information associated with the user, an estimated fuel usage, of the vehicle, associated with a route between the home location and the destination location;

determine, based on the fuel information and the estimated fuel usage, an estimated quantity of trips between the home location and the destination location available with a fuel supply in the vehicle, wherein the one or more processors, to determine the estimated quantity of trips, are configured to determine the estimated quantity of trips based on:

first historic fuel usage information associated with historic travel from the home location to the destination location, and second historic fuel usage information associated with historic travel from the destination location to the home location;

generate refueling information, associated with the vehicle, based on the driving behavior information and the estimated quantity of trips between the home location and the destination location, wherein the refueling information includes information identifying at least one of:

the estimated quantity of trips between the home location and the destination location, a recommended date and time to refuel the vehicle, or
a recommended refueling location; and
transmit the refueling information to the client device.

9. The device of claim 8, wherein the one or more processors, when determining the home location and the destination location, are to:
determine, based on the location information, at least one of:
that a particular location of the vehicle remains substantially the same or substantially similar for a time period that satisfies a threshold time period,
that the time period is associated with a particular time window of one or more days, or
that the vehicle is located at the particular location during the particular time window for a quantity of days that satisfies a threshold quantity of days, and
determine at least one of the home location or the destination location based on at least one of:
determining that the particular location of the vehicle remains the same or substantially similar for the time period that satisfies the threshold time period,
determining that the time period is associated with the particular time window of one or more days, or
determining that the vehicle is located at the particular location during the particular time window for the quantity of days that satisfies the threshold quantity of days.

10. The device of claim 8, wherein the one or more processors are further to:
determine the recommended refueling location based on at least one of:
the recommended refueling location being located within a particular distance from at least one of:
the home location, or
the destination location,
historical refueling information, associated with the user, included in the driving behavior information, or
fuel price information associated with the recommended refueling location.

11. The device of claim 8, wherein the driving behavior information comprises:
refueling behavior information associated with the user,
wherein the refueling behavior information includes information identifying one or more refueling events associated with the vehicle, and
wherein the one or more processors are further to:
identify a refueling event, of the one or more refueling events, by:
determining that the vehicle has entered a point of interest associated with a refueling station,
determining a first fuel level of the vehicle when the vehicle entered the point of interest,
determining a second fuel level of the vehicle after the vehicle leaves the point of interest, and
determining that the refueling event occurred based on the second fuel level being greater relative to the first fuel level.

12. The device of claim 8, wherein the one or more processors, when generating the refueling information, are to:
generate the refueling information based on driving behavior information associated with one or more other users to determine the refueling information,
wherein the driving behavior information associated with the one or more other users is selected based on a similarity of the driving behavior information associated with the one or more other users and the driving behavior information associated with the user.

13. The device of claim 8, wherein the driving behavior information comprises at least one of:
acceleration information associated with the user,
average speed information associated with the user,
an amount of driving time associated with the user,
historical route information associated with the user, or
historical refueling information associated with the user.

14. The device of claim 8, wherein the fuel information comprises at least one of:
information identifying a type of fuel associated with the vehicle,
information identifying a fuel level associated with the vehicle, or
information identifying an average fuel economy associated with the vehicle.

15. A non-transitory computer-readable medium storing instructions, the instructions comprising:
one or more instructions that, when executed by one or more processors of a travel management platform, cause the one or more processors to:
receive:
fuel information associated with a vehicle, and
location information associated with the vehicle;
determine, based on the location information and using a plurality of machine learning algorithms, a home location associated with a user of a client device and a destination location associated with the user;
determine, based on the fuel information and driving behavior information associated with the user, an estimated fuel usage, of the vehicle, associated with a route between the home location and the destination location;
determine, based on the fuel information and the estimated fuel usage, an estimated quantity of trips between the home location and the destination location available with a fuel supply in the vehicle,
wherein the one or more instructions, that cause the one or more processors to determine the estimated quantity of trips, cause the one or more processors to determine the estimated quantity of trips based on:
first historic fuel usage information associated with historic travel from the home location to the destination location, and
second historic fuel usage information associated with historic travel from the destination location to the home location;
generate refueling information, associated with the vehicle, based on the driving behavior information and the estimated quantity of trips between the home location and the destination location,
wherein the refueling information includes information identifying at least one of:
the estimated quantity of trips between the home location and the destination location,
a recommended date and time to refuel the vehicle, or
a recommended refueling location; and
transmit the refueling information to the client device.

16. The non-transitory computer-readable medium of claim 15, wherein the one or more instructions, that cause the one or more processors to determine the home location and the destination location, cause the one or more processors to:

determine, based on the location information, at least one of:
    that a particular location of the vehicle remains the same or substantially similar for a time period that satisfies a threshold time period,
    that the time period is associated with a particular time window of one or more days, or
    that the vehicle is located at the particular location during the particular time window for a quantity of days that satisfies a threshold quantity of days, and
determine at least one of the home location or the destination location based on at least one of:
    determining that the particular location of the vehicle remains the same or substantially similar for the time period that satisfies the threshold time period,
    determining that the time period is associated with the particular time window of one or more days, or
    determining that the vehicle is located at the particular location during the particular time window for the quantity of days that satisfies the threshold quantity of days.

17. The non-transitory computer-readable medium of claim 15, wherein the one or more instructions, when executed by the one or more processors, further cause the one or more processors to:
determine the recommended refueling location based on at least one of:
    the recommended refueling location being located within a particular distance from at least one of:
        the home location, or
        the destination location,
    historical refueling information, associated with the user, included in the driving behavior information, or
    fuel price information associated with the recommended refueling location.

18. The non-transitory computer-readable medium of claim 15, wherein the one or more instructions, that cause the one or more processors to generate the refueling information, cause the one or more processors to:
generate the refueling information based on driving behavior information associated with one or more other users to determine the refueling information,
    wherein the driving behavior information associated with the one or more other users is selected based on a similarity of the driving behavior information associated with the one or more other users and the driving behavior information associated with the user.

19. The non-transitory computer-readable medium of claim 15, wherein the driving behavior information comprises at least one of:
acceleration information associated with the user,
average speed information associated with the user,
an amount of driving time associated with the user,
historical route information associated with the user, or
historical refueling information associated with the user.

20. The non-transitory computer-readable medium of claim 15, wherein the fuel information comprises at least one of:
information identifying a type of fuel associated with the vehicle,
information identifying a fuel level associated with the vehicle, or
information identifying an average fuel economy associated with the vehicle.

\* \* \* \* \*